US008093336B2

(12) United States Patent
Jacob et al.

(10) Patent No.: US 8,093,336 B2
(45) Date of Patent: Jan. 10, 2012

(54) HETEROGENEOUS POLYMER BLEND WITH CONTINUOUS ELASTOMERIC PHASE AND PROCESS OF MAKING THE SAME

(75) Inventors: Sunny Jacob, Seabrook, TX (US); Peijun Jiang, League City, TX (US); Aspy K. Mehta, Humble, TX (US); Pradeep P. Shirodkar, Stow, OH (US); Armenag H. Dekmezian, Kingwood, TX (US); Weiqing Weng, Houston, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

(21) Appl. No.: 13/090,750

(22) Filed: Apr. 20, 2011

(65) Prior Publication Data

US 2011/0196102 A1 Aug. 11, 2011

Related U.S. Application Data

(62) Division of application No. 11/295,927, filed on Dec. 7, 2005, now Pat. No. 7,951,872.

(60) Provisional application No. 60/693,030, filed on Jun. 22, 2005.

(51) Int. Cl.
*C08F 8/00* (2006.01)
*C08J 3/00* (2006.01)

(52) U.S. Cl. ......... 525/192; 525/193; 525/197; 525/198

(58) Field of Classification Search .................. 525/192, 525/193, 197, 198
See application file for complete search history.

(56) References Cited

U.S. PATENT DOCUMENTS

| | | | |
|---|---|---|---|
| 3,629,212 A | 12/1971 | Benedikter et al. |
| 3,689,597 A | 9/1972 | Mahlman |
| 3,882,197 A | 5/1975 | Fritz et al. |
| 3,888,949 A | 6/1975 | Shih |
| 4,016,342 A | 4/1977 | Wagensommer |
| 4,059,651 A | 11/1977 | Smith, Jr. |
| 4,130,535 A | 12/1978 | Coran et al. |
| 4,146,692 A | 3/1979 | Wagensommer et al. |
| 4,276,195 A | 6/1981 | Verkade |
| 4,306,041 A | 12/1981 | Cozewith et al. |
| 4,311,628 A | 1/1982 | Abdou-Sabet et al. |
| 4,999,403 A | 3/1991 | Datta et al. |
| 5,350,817 A | 9/1994 | Winter et al. |
| 5,504,171 A | 4/1996 | Etherton et al. |
| 5,514,761 A | 5/1996 | Etherton et al. |
| 5,598,547 A | 1/1997 | Beard et al. |
| 5,670,595 A | 9/1997 | Meka et al. |
| 5,696,045 A | 12/1997 | Winter et al. |
| 6,005,053 A | 12/1999 | Parikh et al. |
| 6,114,457 A | 9/2000 | Markel et al. |
| 6,114,477 A | 9/2000 | Merrill et al. |
| 6,117,962 A | 9/2000 | Weng et al. |
| 6,143,846 A | 11/2000 | Herrmann et al. |
| 6,147,180 A | 11/2000 | Markel et al. |
| 6,184,327 B1 | 2/2001 | Weng et al. |
| 6,197,791 B1 | 3/2001 | Venkatesan et al. |
| 6,197,910 B1 | 3/2001 | Weng et al. |
| 6,207,606 B1 | 3/2001 | Lue et al. |
| 6,207,756 B1 | 3/2001 | Datta et al. |
| 6,225,432 B1 | 5/2001 | Weng et al. |
| 6,245,856 B1 | 6/2001 | Kaufman et al. |
| 6,248,832 B1 | 6/2001 | Peacock |
| 6,258,903 B1 | 7/2001 | Mawson et al. |
| 6,268,438 B1 | 7/2001 | Ellul et al. |
| 6,271,323 B1 | 8/2001 | Loveday et al. |
| 6,288,171 B2 | 9/2001 | Finerman et al. |
| 6,297,301 B1 | 10/2001 | Erderly et al. |
| 6,310,140 B1 | 10/2001 | Raetzsch et al. |
| 6,319,998 B1 | 11/2001 | Cozewith et al. |
| 6,323,284 B1 | 11/2001 | Peacock |
| 6,340,703 B1 | 1/2002 | Kelly |
| 6,342,564 B1 | 1/2002 | Pitkanen et al. |
| 6,342,574 B1 | 1/2002 | Weng et al. |
| 6,388,016 B1 | 5/2002 | Abdou-Sabet et al. |
| 6,407,174 B1 | 6/2002 | Ouhadi |
| 6,407,189 B1 | 6/2002 | Herrmann |
| 6,423,793 B1 | 7/2002 | Weng et al. |
| 6,444,773 B1 | 9/2002 | Markel |
| 6,455,638 B2 | 9/2002 | Laughner et al. |
| 6,555,635 B2 | 4/2003 | Markel |
| 6,569,965 B2 | 5/2003 | Markel et al. |
| 6,573,350 B1 | 6/2003 | Markel et al. |
| 6,635,715 B1 | 10/2003 | Datta et al. |
| 6,660,809 B1 | 12/2003 | Weng et al. |
| 6,750,307 B2 | 6/2004 | Weng et al. |
| 6,770,714 B2 | 8/2004 | Ommundsen et al. |
| 6,774,191 B2 | 8/2004 | Weng et al. |

(Continued)

FOREIGN PATENT DOCUMENTS

EP 0 277 004 8/1988

(Continued)

OTHER PUBLICATIONS

Howe, Polymer Data Handbook, 1999, Mark—Editor, Oxford University Press, pp. 780-786. Markel et al., Metallocene-Based Branch-Block Thermoplastic Elastomers, Macromolecules, 2000, vol. 33, No. 23, pp. 8541-8548.
Vara, Techniques for Achieving High Hardness EPDM formulations, Rubber World, 2003, vol. 227, No. 5, pp. 33-38 and 75.
Hongjun et al., "*Structure and Properties of Impact Copolymer Polypropylene. II. Phase Structure and Crystalline Morphology*", Journal of Applied Polymer Science, 1999, vol. 71, No. 1, pp. 103-113.
Vara et al., "*Techniques for Achieving High Hardness EPDM formulations*", Rubber World, 2003, vol. 227, No. 5, pp. 33-38 and 75.

*Primary Examiner* — Nathan M Nutter
(74) *Attorney, Agent, or Firm* — Darryl M. Tyus

(57) ABSTRACT

A heterogeneous polymer blend comprises a dispersed phase comprising a thermoplastic first polymer having a crystallinity of at least 30% and a continuous phase comprising a second polymer different from the first polymer. The second polymer has a crystallinity of less than 20% and is at least partially cross-linked.

18 Claims, 2 Drawing Sheets

U.S. PATENT DOCUMENTS

| | | |
|---|---|---|
| 6,780,936 B1 | 8/2004 | Agarwal et al. |
| 6,809,168 B2 | 10/2004 | Agarwal et al. |
| 6,927,265 B2 | 8/2005 | Kaspar et al. |
| 6,977,287 B2 | 12/2005 | Agarwal et al. |
| 7,005,491 B2 | 2/2006 | Weng et al. |
| 7,101,936 B2 | 9/2006 | Weng et al. |
| 7,223,822 B2 | 5/2007 | Abhari et al. |
| 7,256,240 B1 | 8/2007 | Jiang |
| 7,294,681 B2 | 11/2007 | Jiang et al. |
| 7,339,018 B2 | 3/2008 | Arjunan |
| 7,541,402 B2 | 6/2009 | Abhari et al. |
| 7,550,528 B2 | 6/2009 | Abhari et al. |
| 7,619,038 B2 | 11/2009 | Mehta et al. |
| 7,700,707 B2 | 4/2010 | Abhari et al. |
| 7,709,577 B2 | 5/2010 | Jiang et al. |
| 2001/0007896 A1 | 7/2001 | Agarwal et al. |
| 2001/0053837 A1 | 12/2001 | Agarwal et al. |
| 2002/0013440 A1 | 1/2002 | Agarwal et al. |
| 2003/0013623 A1 | 1/2003 | Tse et al. |
| 2003/0195299 A1 | 10/2003 | Stevens et al. |
| 2004/0087749 A1 | 5/2004 | Agarwal et al. |
| 2004/0087750 A1 | 5/2004 | Agarwal et al. |
| 2004/0116609 A1 | 6/2004 | Datta et al. |
| 2004/0127614 A1 | 7/2004 | Jiang et al. |
| 2006/0199873 A1 | 9/2006 | Mehta et al. |
| 2006/0293453 A1 | 12/2006 | Jiang et al. |
| 2006/0293455 A1 | 12/2006 | Jiang et al. |
| 2006/0293460 A1 | 12/2006 | Jacob et al. |
| 2006/0293461 A1 | 12/2006 | Jiang et al. |
| 2006/0293462 A1 | 12/2006 | Jacob et al. |
| 2007/0001651 A1 | 1/2007 | Harvey |
| 2007/0129497 A1 | 6/2007 | Jiang et al. |
| 2007/0282073 A1 | 12/2007 | Weng et al. |
| 2007/0284787 A1 | 12/2007 | Weng et al. |
| 2008/0081878 A1 | 4/2008 | Jiang et al. |
| 2010/0152360 A1 | 6/2010 | Jiang et al. |
| 2010/0152382 A1 | 6/2010 | Jiang et al. |
| 2010/0152383 A1 | 6/2010 | Jiang et al. |
| 2010/0152388 A1 | 6/2010 | Jiang et al. |
| 2010/0152390 A1 | 6/2010 | De Gracia et al. |

FOREIGN PATENT DOCUMENTS

| | | |
|---|---|---|
| EP | 0 373 660 | 6/1990 |
| EP | 0 374 695 | 6/1990 |
| EP | 0 395 083 | 10/1990 |
| EP | 0 400 333 | 12/1990 |
| EP | 0 426 637 | 5/1991 |
| EP | 0 619 325 | 10/1994 |
| EP | 0 629 631 | 12/1994 |
| EP | 0 629 632 | 12/1994 |
| EP | 0 770 106 | 5/1997 |
| EP | 1 002 814 | 5/2000 |
| EP | 1 354 901 | 10/2003 |
| JP | 11/335501 | 7/1999 |
| WO | WO 98/32784 | 7/1998 |
| WO | WO 98/49229 | 11/1998 |
| WO | WO 01/09200 | 2/2001 |
| WO | WO 01/81493 | 11/2001 |

Figure 1 (image size = 20×20 μm)
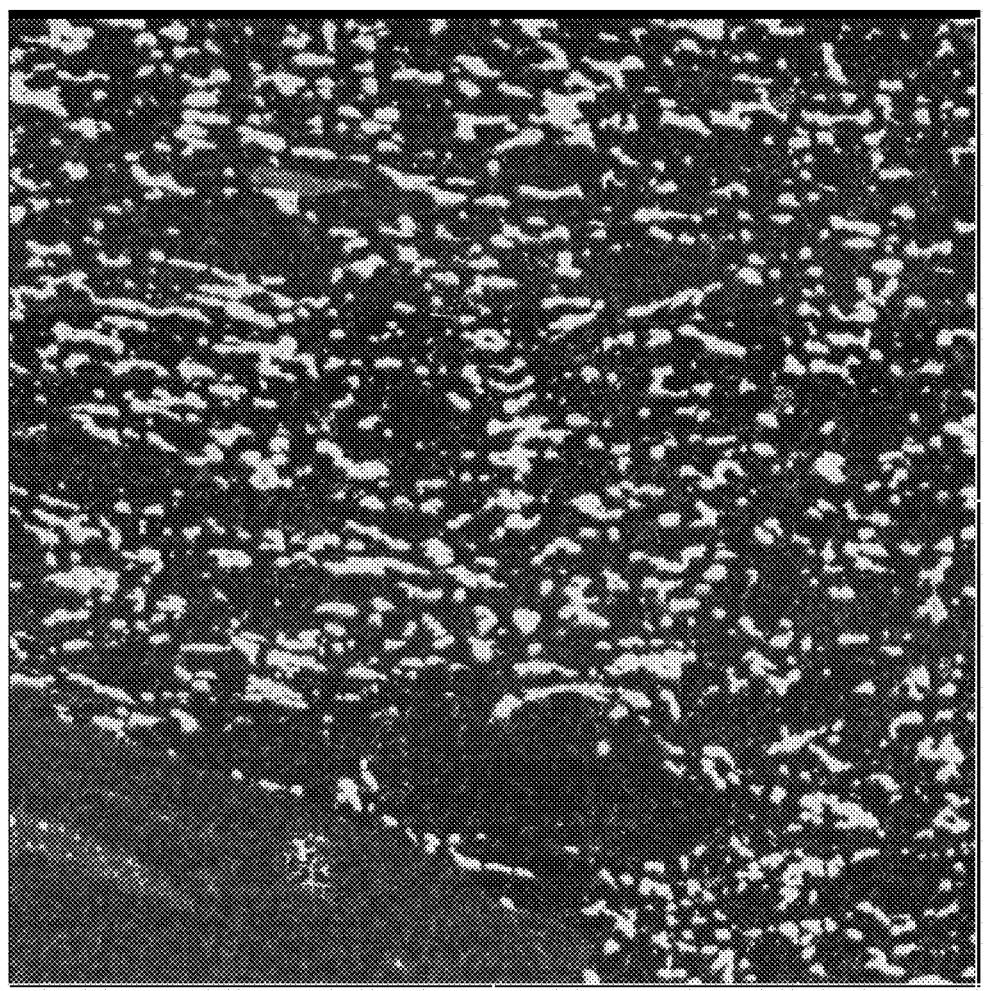

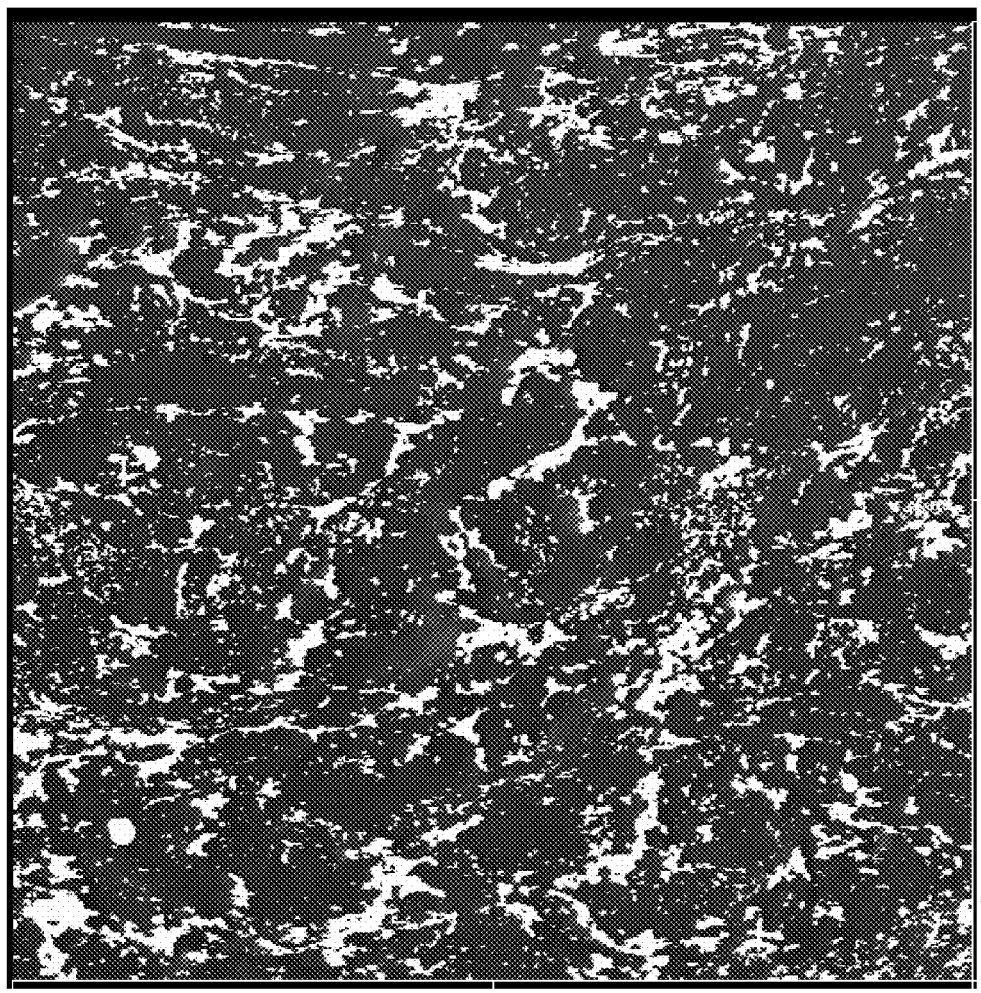
Figure 2 (image size = 20×20 μm)

HETEROGENEOUS POLYMER BLEND WITH CONTINUOUS ELASTOMERIC PHASE AND PROCESS OF MAKING THE SAME

PRIORITY CLAIM

This application is a divisional of U.S. application Ser. No. 11/295,927 filed on Dec. 7, 2005, now U.S. Pat. No. 7,951, 872. This application also claims the benefit of U.S. Provisional Patent Application No. 60/693,030, filed on Jun. 22, 2005. All of which are incorporated by reference in their entireties.

FIELD

This invention relates to a thermo-processable heterogeneous polymer blend, and to an in-reactor process of making such a polymer blend.

BACKGROUND

Heterogeneous polymer blends comprising a second polymer dispersed in a matrix of a first polymer are well-known and, depending on the properties and the relative amounts of the first and second polymers, a wide variety of such polymer blends can be produced. Of particular interest are polymer blends, also referred to as thermoplastic elastomers, in which the first polymer is a thermoplastic material, such as polypropylene, and the second polymer is an elastomeric material, such as an ethylene-propylene elastomer or an ethylene-propylene-diene (EPDM) rubber. Examples of such thermoplastic elastomers include polypropylene impact copolymers, thermoplastic olefins and thermoplastic vulcanizates.

Unlike conventional vulcanized rubbers, thermoplastic elastomers can be processed and recycled like thermoplastic materials, yet have properties and performance similar to that of vulcanized rubber at service temperatures. For this reason, thermoplastic elastomers are useful for making a variety of articles such as weather seals, hoses, belts, gaskets, moldings, boots, elastic fibers and like articles. They are also particularly useful for making articles by blow molding, extrusion, injection molding, thermo-forming, elasto-welding and compression molding techniques. In addition, thermoplastic elastomers are often used for making vehicle parts, such as but not limited to, weather seals, brake parts including, but not limited to cups, coupling disks, diaphragm cups, boots such as constant velocity joints and rack and pinion joints, tubing, sealing gaskets, parts of hydraulically or pneumatically operated apparatus, o-rings, pistons, valves, valve seats, and valve guides.

One method of making the aforementioned polymer blends is by mixing two different polymers after they have been polymerized to achieve a target set of properties. However, this method is relatively expensive making it much more desirable to make blends by direct polymerization. Blending by direct polymerization is well known in the prior art and typically uses multiple reactors in series, where the product from one reactor is fed to a second reactor having a different polymerizing environment, resulting in a final product that is an intimate mix of two different products. Examples of such processes employing vanadium catalysts in series reactor operation to produce different types of EPDM compositions are disclosed in U.S. Pat. Nos. 3,629,212, 4,016,342, and 4,306,041.

U.S. Pat. No. 6,245,856 discloses a thermoplastic olefin composition comprising polypropylene, an ethylene-alpha olefin elastomer and a compatabilizer comprising an ethylene-propylene copolymer having a propylene content of greater than 80 weight percent. According to this patent, the individual components of the composition can be separately manufactured and mechanically blended together in a mechanical mixer or two or more of the components can be prepared as a reactor blend using a series of reactors where each component is prepared in a separate reactor and the reactant is then transferred to another reactor where a second component is prepared. In the absence of the compatabilizer, the elastomer phase is said to be uneven with particles >5 microns, whereas the addition of the compatabilizer is said to improve dispersion such that the elastomer phase has a particle size of about 1 micron. The elastomer phase of this polymer blend is not cross-linked.

U.S. Pat. No. 6,207,756 describes a process for producing a blend of a continuous phase of a semi-crystalline plastic, such as polypropylene, and a discontinuous phase of an amorphous elastomer, such as a terpolymer of ethylene, a $C_3$-$C_{20}$ alpha olefin and a non-conjugated diene. The blends are produced in series reactors by producing a first polymer component in a first reactor, directing the effluent to a second reactor and producing the second polymer component in solution in the second reactor in the presence of the first polymeric component. U.S. Pat. No. 6,319,998 also discloses using series solution polymerizations to produce blends of ethylene copolymers. U.S. Pat. No. 6,770,714 discloses the use of parallel polymerizations to produce different polymeric components that are then blended through extrusion or using other conventional mixing equipment. One polymeric component is a propylene homopolymer or copolymer and the second polymeric component is an ethylene copolymer.

One particularly useful form of thermoplastic elastomer is a thermoplastic vulcanizate ("TPV"), which comprises a thermoplastic resin matrix, such as polypropylene, within which are dispersed particles of a cured elastomeric material, such as an EPDM rubber. TPVs are normally produced by a process of "dynamic vulcanization", which is a process of vulcanizing or cross-linking the elastomeric component during intimate melt mixing with the thermoplastic resin, together with plasticizers (e.g. process oils), fillers, stabilizers, and a cross-linking system, under high shear and above the melting point of the thermoplastic. The mixing is typically done in a twin-screw extruder, to create a fine dispersion of the elastomeric material within the thermoplastic resin while the elastomeric material is cured. The levels of thermoplastic resin and plasticizer (oil) can be adjusted to produce grades having different profiles of hardness, rheology and engineering properties, although in general it is difficult to produce TPVs by dynamic vulcanization in which the content of the elastomeric phase is greater than 50 wt % of the overall polymer blend. Examples of dynamic vulcanization are described in the U.S. Pat. Nos. 4,130,535 and 4,311,628.

However, while dynamic vulcanization is effective in producing TPVs with a unique profile of properties, it is expensive and suffers from a number of disadvantages. Thus the production of quality product is technically challenging and specialized equipment is needed. Moreover, the process involves many steps, each one critical to the eventual quality of the final product. Forming the polymer blend normally involves separately comminuting bales of the elastomeric polymer (which is typically how EPDM rubber is commercially distributed), mechanically mixing it with the thermoplastic resin along with the processing oils, curatives, and other ingredients in a suitable high shear mixing device to comminute the rubber particles and cure them to generate cured rubber particles embedded in a continuous thermoplastic resin matrix. The cured rubber particles in the finished products have an averaged particle size of 1 to 10 micron. Careful injection of processing oil helps manage the rheological characteristics of the fluid in the reactive extruder (to minimize pressure buildup) as well as product properties such as hardness. Precise control over the size and distribution of the cross-linked elastomer particles is critical, as it affects properties such as elastic recovery (as measured through compression set). While the products produced with existing technology have many desirable properties, there are gaps in the overall properties profile. Some of these are the need for higher service temperatures, improved elastic recovery, softer products, higher tensile strength, easier processability, oil-free compositions, and colorless products.

An improved process for producing TPVs is disclosed in U.S. Pat. No. 6,388,016, incorporated herein in its entirety, in which a polymer blend is produced by solution polymerization in series reactors employing metallocene catalysts and the resultant blend is subjected to dynamic vulcanization. In particular, the process involves feeding a first set of monomers selected from ethylene and higher alpha-olefins, and a solvent, to a first continuous flow stirred tank reactor, adding a metallocene catalyst to the first reactor in an amount of 50 to 100 weight % of the total amount of catalyst added to all reactors, operating the first reactor to polymerize the monomers to produce an effluent containing a first polymer, feeding the effluent from the first reactor to a second continuous flow stirred tank reactor, feeding a second set of monomers selected from ethylene, higher alpha-olefins and non-conjugated dienes, and optionally additional solvent, to the second reactor, operating the second reactor to polymerize the second monomers to produce a second polymer containing diene, recovering the resulting first and second polymers and blending them with a curing agent under conditions of heat and shear sufficient to cause the blend to flow and to at least partially crosslink the diene-containing polymer and form a dispersion of cured diene-containing particles in a matrix of the first polymer. It will, however, be seen that this improved process still relies on dynamic vulcanization to cure the elastomeric component. As a result the cured diene-containing particles have an average particle size in the range of 1 to 10 microns.

An in-reactor process for producing cross-linked polymer blends, such as TPVs, is disclosed in our co-pending U.S. Patent Application Ser. No. 60/693,030, filed on Jun. 22, 2005. In this process, at least one first monomer is polymerized to produce a thermoplastic first polymer; and then at least part of the first polymer is contacted with at least one second monomer and at least one polyene under conditions sufficient to produce and simultaneously cross-link a second polymer as a dispersed phase within a continuous phase of the first polymer. In the resultant polymer blend, the thermoplastic first polymer has a crystallinity of at least 30% and the dispersed phase comprises particles of the second polymer having an average size of less than 1 micron, wherein the second polymer has a crystallinity of less than 20% and is at least partially cross-linked. In this way, the need for a separate dynamic vulcanization step to cross-link the second polymer is avoided.

All of the heterogeneous polymer blends described above have a thermoplastic continuous phase with discrete domains of an elastomeric phase dispersed in the thermoplastic matrix. To retain the continuous thermoplastic phase in such blends, it is necessary to ensure that the amount of thermoplastic material present in the blends is reasonably high. However, a high content of thermoplastic material leads to production of hard polymer blends. In contrast, there is a growing demand for a wide variety of articles that are soft and soothing to the touch. It is also important for these articles to have strength, durability, nontacky and good balance of oil resistance and compression set required by the applications. There is therefore significant interest in producing heterogeneous polymer blends having a high content of cross-linked elastomer.

SUMMARY

In one aspect, the present invention resides in a heterogeneous polymer blend comprising:

(a) a dispersed phase comprising a thermoplastic first polymer having a crystallinity of at least 30%; and (b) a continuous phase comprising a second polymer different from the first polymer, the second polymer having a crystallinity of less than 20% and being at least partially cross-linked.

Preferably, said second polymer is at least partially cross-linked such that at least a fraction of said continuous phase is insoluble in xylene. Conveniently, said fraction insoluble in xylene comprises at least 5%, such as at least 10%, such as at least 20%, such as at least 30%, by weight of said continuous phase.

Preferably, said dispersed phase comprises particles of said thermoplastic first polymer having an average particle size less than 10 microns, preferably less than 5 microns, more preferably less than 3 micron.

Conveniently, the polymer blend is substantially free of processing oil and curative.

In one embodiment, no more than about 70 wt %, preferably no more than about 50 wt %, and more preferably no more than 30 wt %, of the second polymer is extractable in cyclohexane at 23° C.

Conveniently, said dispersed phase comprises less than 50 wt %, such as less than 30 wt %, for example less than 20 wt % of the total heterogeneous polymer blend.

Preferably, said thermoplastic first polymer is a homopolymer of a $C_2$ to $C_{20}$ olefin or a copolymer of a $C_2$ to $C_{20}$ olefin with less than 15 wt % of at least one comonomer.

Preferably, the second polymer is produced from a plurality of comonomers comprising at least one $C_3$ to $C_{20}$ olefin and at least one polyene. Conveniently, the polyene has at least two polymerizable unsaturated groups and preferably is a diene.

In a further aspect, the invention resides in a process for producing a heterogeneous polymer blend comprising (a) a dispersed phase comprising a thermoplastic first polymer having at least 30% crystallinity; and (b) a continuous phase comprising a second polymer different from the first polymer, the second polymer having a crystallinity less than that of the first polymer and being at least partially cross-linked, the process comprising:

(i) polymerizing at least one first monomer to produce the thermoplastic first polymer;

(ii) contacting at least part of said first polymer with at least one second monomer and at least one polyene under conditions sufficient to polymerize said second monomer to produce, and simultaneously cross-link, said second polymer as finely divided particles.

In one embodiment, the product of said contacting (ii) is subjected to an additional curing step to further cross-link said second polymer.

In yet a further aspect, the present invention resides in a process for producing a heterogeneous polymer blend, the process comprising:

(a) selecting a catalyst capable of polymerizing a $C_2$ to $C_{20}$ olefin to produce a first polymer having at least 30% crystallinity;

(b) contacting said catalyst with one or more $C_2$ to $C_{20}$ olefins at a temperature of at least 50° C. to produce a first polymer having at least 30% crystallinity;

(c) contacting said first polymer and said catalyst with at least one $C_3$ to $C_{20}$ olefin and at least one polyene under conditions sufficient to polymerize said at least one $C_3$ to $C_{20}$ olefin to produce, and simultaneously cross-link, a second polymer, whereby the product of said contacting (c) is a heterogeneous polymer blend comprising a dispersed phase of the first polymer having at least 30% crystallinity and a continuous phase of said second polymer, wherein said second polymer is at least partially cross-linked and comprises at least 15 wt % of said $C_3$ to $C_{20}$ olefin and at least 0.0001 wt % of said polyene.

Conveniently, said polyene has at least two polymerizable unsaturated groups.

Conveniently, said catalyst selected in (a) is a single site catalyst comprising at least one catalyst component, normally a metallocene, and at least one activator.

In still yet a further aspect, the present invention resides in a process for producing a heterogeneous polymer blend, the process comprising:

(a) selecting a catalyst capable of polymerizing a $C_2$ to $C_{20}$ olefin to produce a first polymer having at least 30% crystallinity;

(b) contacting said catalyst with one or more $C_2$ to $C_{20}$ olefins at a temperature of at least 50° C. to produce a first polymer having at least 30% crystallinity;

(c) contacting said first polymer together with at least one $C_3$ to $C_{20}$ olefin and at least one polyene with a catalyst capable of polymerizing bulky monomers under conditions sufficient to polymerize said at least one $C_3$ to $C_{20}$ olefin to produce, and simultaneously cross-link, a second polymer, whereby the product of said contacting (c) is a heterogeneous polymer blend comprising a dispersed phase of the first polymer having at least 30% crystallinity and a continuous phase of said second polymer, wherein said second polymer is at least partially cross-linked and comprises at least 15 wt % of said $C_3$ to $C_{20}$ olefin and at least 0.0001 wt % of said polyene.

In one embodiment, the catalyst employed in contacting (c) is the same as the catalyst employed in contacting (b).

In another embodiment, the catalyst employed in contacting (c) is the different from the catalyst employed in contacting (b) and catalyst quenching is applied between the contacting (b) and the contacting (c).

In one embodiment, the product of said contacting (c) is subjected to an additional curing step to further cross-link said second polymer.

DESCRIPTION OF THE DRAWINGS

FIG. 1 is an atomic force micrograph (AFM) of the polymer blend produced in Example 1.

FIG. 2 is an atomic force micrograph (AFM) of the polymer blend produced in Example 2.

DETAILED DESCRIPTION

For purposes of this invention and the claims thereto when a polymer or oligomer is referred to as comprising an olefin, the olefin present in the polymer or oligomer is the polymerized or oligomerized form of the olefin, respectively. Likewise the use of the term polymer is meant to encompass homopolymers and copolymers. In addition the term copolymer includes any polymer having 2 or more monomers. Thus, as used herein, the term "polypropylene" means a polymer made of at least 50% propylene units, preferably at least 70% propylene units, more preferably at least 80% propylene units, even more preferably at least 90% propylene units, even more preferably at least 95% propylene units or 100% propylene units.

As used herein, the term "heterogeneous blend" means a composition having two or more morphological phases in the same state. For example a blend of two polymers where one polymer forms discrete packets (or finely divided phase domains) dispersed in a matrix of another polymer is said to be heterogeneous in the solid state. Also a heterogeneous blend is defined to include co-continuous blends where the blend components are separately visible, but it is unclear which is the continuous phase and which is the discontinuous phase. Such morphology is determined using scanning electron microscopy (SEM) or atomic force microscopy (AFM). In the event the SEM and AFM provide different data, then the AFM data are used. By continuous phase is meant the matrix phase in a heterogeneous blend. By discontinuous phase is meant the dispersed phase in a heterogeneous blend. The finely divided phase domains of the discontinuous phase are also referred as particles.

In contrast, a "homogeneous blend" is a composition having substantially one morphological phase in the same state. For example a blend of two polymers where one polymer is miscible with another polymer is said to be homogeneous in the solid state. Such morphology is determined using scanning electron microscopy. By miscible is meant that that the blend of two or more polymers exhibits single-phase behavior for the glass transition temperature, e.g. the Tg would exist as a single, sharp transition temperature on a dynamic mechanical thermal analyzer (DMTA) trace of tan δ (i.e., the ratio of the loss modulus to the storage modulus) versus temperature. By contrast, two separate transition temperatures would be observed for an immiscible blend, typically corresponding to the temperatures for each of the individual components of the blend. Thus a polymer blend is miscible when there is one Tg indicated on the DMTA trace. A miscible blend is homogeneous, while an immiscible blend is heterogeneous.

As used herein the term "substantially free of processing oil" means that the relevant product contains little or no of the oil-based processing aids, such as extender oils, synthetic processing oils, oligomeric extenders, or a combination thereof, that are added to conventional polymer blends to control the rheological characteristics of the blends during dynamic vulcanization. Preferably the relevant product contains less than 1 weight % processing oil, more preferably less than 0.5 weight %, most preferably less than 0.1 weight %, processing oil. The amount of oil in the polymer blend is determined using solvent extraction as described the example section.

By virtue of the fact that the second polymer of the polymer blend of the invention is formed as at least partially cross-linked particles in the polymerization reactor, the need for a subsequent dynamic vulcanization step and hence the need for addition of processing oil can be avoided. It is, however, to be appreciated that in some cases the polymer blend of the invention may be subjected to post-polymerization curing and/or vulcanization to produce additional cross-linking of the second polymer.

As used herein the term "curative" means any of the additives conventionally added to polymer blends to effect curing of one or more components of the blend during a post-polymerization, dynamic vulcanization step. Examples of known curatives include sulfur, sulfur donors, metal oxides, resin systems, such as phenolic resins, peroxide-based systems, hydrosilation with platinum or peroxide and the like, both with and without accelerators and coagents.

The term dynamic vulcanization refers to a vulcanization or curing process for a rubber contained in a blend with a thermoplastic resin, wherein the rubber is crosslinked or vulcanized under conditions of high shear at a temperature above the melting point of the thermoplastic. Dynamic vulcanization can occur in the presence of a processing oil, or the oil can be added after dynamic vulcanization (i.e., post added), or both (i.e., some can be added prior to dynamic vulcanization and some can be added after dynamic vulcanization).

As used herein the term "bulky monomer" means an olefin monomer that is not a linear $C_2$ to $C_{20}$ alpha olefin. Bulky monomers include cyclic olefin monomers, such as 5-ethylidene-2-norbornadiene (ENB), 5-vinyl-2-norbornene (VNB) and cyclopentadiene; branched olefin monomers, such as 3,5,5 trimethyl hexene-1; and macromonomers, such as terminally unsaturated oligomers or terminally unsaturated polymers.

As used herein, the term "terminal unsaturation" is defined to mean vinyl unsaturation, vinylene unsaturation or vinylidene unsaturation on a polymer chain end, with vinyl unsaturation being preferred.

This invention relates to a heterogeneous polymer blend comprising a semi-crystalline (at least 30% crystalline) thermoplastic first polymer that constitutes the dispersed phase and a continuous phase of a second polymer different from, and less crystalline than, the first polymer. The second polymer is at least partially cross-linked as a result of an in-situ reaction between a polyene and the second polymer that takes place concurrently with the polymerization of the second polymer. The presence and amount of such partially cross-linked polymers in the blend can be determined by a multistep solvent extraction process. In this process the direct product of the polymerization process, without undergoing any additional curing steps, is first contacted with cyclohexane at 25° C. for 48 hours to dissolve the uncross-linked and lightly branched elastomeric components of the blend and then the remaining solids are refluxed at the boiling temperature of xylene for 24 hours with xylene to isolate the "at least partially cross-linked polymer". The "at least partially cross-linked polymer" is also referred to herein as "xylene insolubles". Details of the solvent extraction procedure are given in the Examples.

The heterogeneous polymer blends of the present invention contain hybrid polymer. While not wishing to bound by theory, it is believed that reactive intermediates generated in the polymerization of the first polymer engage in the polymerization processes taking place in the formation of the second polymer, producing hybrid polymers (also known as branch-block copolymers) that combine the characteristics of the first and second polymers, such as the melting temperature of the first polymer and the lower glass transition temperatures of the second polymer.

This invention also relates to a process for making the above polymer blend. In a reactor, a semi-crystalline polymer is produced in a first polymerization step. In a second polymerization step, the elastomeric polymer is synthesized, in the presence of the semi-crystalline polymer phase. The elastomer is crosslinked through the use of multifunctional monomers, particularly a polyene having at least two polymerizable unsaturated groups, with the degree of crosslinking being controlled by the reaction environment during the polymerization.

Following the two polymerization steps, the product composition can be optionally subjected to a dynamic vulcanization step to enhance the degree of cross-linking of the elastomeric phase.

The First Polymer

The dispersed phase of the present heterogeneous polymer blend may be any crystalline or semi-crystalline thermoplastic polymer or a mixture thereof Useful thermoplastic polymers have a crystallinity of at least 30%, more preferably at least 40% as determined by differential scanning calorimetry (DSC). The first polymer provides the composition with required tensile strength and temperature resistance. Accordingly, semi-crystalline polymers with a melting temperature, as measured by DSC, above 100° C., preferably above 120° C., preferably above 140° C. are desired. Typically, the first polymer has a crystallization temperature (Tc) between about 20 and about 120° C., such as between about 70 and about 110° C. Polymers with a high glass transition temperature to provide the elevated temperature resistance are also acceptable as the thermoplastic dispersed phase.

Exemplary thermoplastic polymers include the family of polyolefin resins, polyesters (such as polyethylene terephthalate, polybutylene terephthalate), polyamides (such as nylons), polycarbonates, styrene-acrylonitrile copolymers, polystyrene, polystyrene derivatives, polyphenylene oxide, polyoxymethylene, and fluorine-containing thermoplastics. The preferred thermoplastic resins are crystalline polyolefins that are formed by polymerizing $C_2$ to $C_{20}$ olefins such as, but not limited to, ethylene, propylene and $C_4$ to $C_{12}$ α-olefins, such as 1-butene, 1-hexene, 1-octene, 2-methyl-1-propene, 3-methyl-1-pentene, 4-methyl-1-pentene, 5-methyl-1-hexene, and mixtures thereof. Copolymers of ethylene and propylene or ethylene or propylene with another α-olefin, such as butene-1; pentene-1,2-methylpentene-1,3-methylbutene-1; hexene-1,3-methylpentene-1,4-methylpentene-1,3,3-dimethylbutene-1; heptene-1; hexene-1; methylhexene-1; dimethylpentene-1 trimethylbutene-1; ethylpentene-1; octene-1; methylpentene-1; dimethylhexene-1; trimethylpentene-1; ethylhexene-1; methylethylpentene-1; diethylbutene-1; propylpentane-1; decene-1; methylnonene-1; nonene-1; dimethyloctene-1; trimethylheptene-1; ethyloctene-1; methylethylbutene-1; diethylhexene-1 and dodecene-1, may also be used.

In one embodiment, the thermoplastic polymer comprises a propylene homopolymer, or a mixture of propylene homopolymers and copolymers. Typically, the propylene polymer is predominately crystalline, i.e., it has a melting point generally greater than 110° C., alternatively greater than 115° C., and preferably greater than 130° C. The term "crystalline," as used herein, characterizes those polymers that possess high degrees of inter- and intra-molecular order in the solid state. Heat of fusion, a measure of crystallinity, greater than 60 J/g, alternatively at least 70 J/g, alternatively at least 80 J/g, as determined by DSC analysis, is preferred. The heat of fusion is dependent on the composition of the polypropylene. A propylene homopolymer will have a higher heat of fusion than a copolymer or blend of a homopolymer and copolymer.

Where the thermoplastic polymer is a copolymer of propylene, the dispersed phase can vary widely in composition. For example, propylene copolymer containing 10 weight percent or less of a comonomer with predominant isotactic propylene crystalline sequence can be used (i.e., at least 90% by weight propylene). Further, polypropylene segments may be part of graft or block copolymers having a sharp melting point above 110° C. and alternatively above 115° C. and alternatively above 130° C., characteristic of the stereoregular propylene sequences. The dispersed phase may be a combination of homopolypropylene, and/or random, and/or block copolymers as described herein. When the dispersed phase is a random copolymer, the percentage of the copolymerized alpha-olefin in the copolymer is, in general, up to 9% by weight, alternatively 0.5% to 8% by weight, alternatively 2% to 6% by weight. The preferred alpha-olefins contain 2 or from 4 to 12 carbon atoms. One, two or more alpha-olefins can be copolymerized with propylene.

The dispersed particles of the first polymer typically have an average size of less than 10 microns, preferably less than 5 microns, more preferably less than 3 microns.

The Second Polymer

The continuous second polymer phase of the heterogeneous polymer blend of the invention comprises an amorphous or low crystallinity (having a crystallinity of less than 20%) polymer. The second polymer phase is generally an elastomeric copolymer that is polymerized and at the same time cross-linked in the presence of the first polymer. Some non-limiting examples of suitable elastomers for use as the second polymer phase include olefin copolymers, butyl rubber, styrene-butadiene copolymer rubber, butadiene rubber, acrylonitrile rubber, halogenated rubber such as brominated and chlorinated isobutylene-isoprene copolymer rubber, butadiene-styrene-vinyl pyridine rubber, urethane rubber, polyisoprene rubber, epichlolorohydrin terpolymer rubber, and polychloroprene. The second polymer of the heterogeneous polymer blend of the invention can also comprise atactic polymers such as atactic polypropylene. The preferred second polymers are elastomeric olefin copolymers.

Suitable elastomeric copolymers for use in the present invention are copolymers produced by copolymerizing two or more alpha olefins with at least one polyene, normally a diene. More typically, the elastomeric component is a copolymer of ethylene with at least one alpha-olefin monomer, and at least one diene monomer. The alpha-olefins may include, but are not limited to, $C_3$ to $C_{20}$ alpha-olefins, such as propylene, butene-1, hexene-1, 4-methyl-1 pentene, octene-1, decene-1, or combinations thereof The preferred alpha-olefins are propylene, hexene-1, octene-1 or combinations thereof Thus, for example, the second polymer can be an ethylene-propylene-diene (commonly called "EPDM"). Typically, the second polymer contains at least 15 wt % of the $C_3$ to $C_{20}$ olefin and at least 0.0001 wt % of the diene.

Cross-linking of the second polymer phase is facilitated by the presence of a polyene that in one embodiment has at least two unsaturated bonds that can readily be incorporated into the polymer to form the desired cross-linked system. Examples of such polyenes include α,ω-dienes (such as butadiene, 1,4-pentadiene, 1,5-hexadiene, 1,6-heptadiene, 1,7-octadiene, 1,8-nonadiene, 1,9-decadiene, 1,10-undecadiene, 1,11-dodecadiene, 1,12-tridecadiene, and 1,13-tetradecadiene) and certain multi-ring alicyclic fused and bridged ring dienes (such as tetrahydroindene; norborndiene; methyl-tetrahydroindene; dicyclopentadiene; bicyclo-(2.2.1)-hepta-2,5-diene; and alkenyl-, alkylidene-, cycloalkenyl-, and cylcoalkyliene norbornenes [including, e.g., 5-methylene-2-norbornene, 5-ethylidene-2-norbornene, 5-propenyl-2-norbornene, 5-isopropylidene-2-norbornene, 5-(4-cyclopentenyl)-2-norbornene, 5-cyclohexylidene-2-norbornene, and 5-vinyl-2-norbornene]).

In further embodiment, the polyene has at least two unsaturated bonds wherein one of the unsaturated bonds is readily incorporated into a polymer. The second bond may partially take part in polymerization to form cross-linked polymers but normally provides at least some unsaturated bonds in the polymer product suitable for subsequent functionalization (such as with maleic acid or maleic anhydride), curing or vulcanization in post polymerization processes. Examples of polyenes according to said further embodiment include, but are not limited to, butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, and polybutadienes having a molecular weight ($M_w$) of less than 1000 g/mol. Examples of straight chain acyclic dienes include, but are not limited to 1,4-hexadiene and 1,6-octadiene. Examples of branched chain acyclic dienes include, but are not limited to 5-methyl-1,4-hexadiene, 3,7-dimethyl-1,6-octadiene, and 3,7-dimethyl-1,7-octadiene. Examples of single ring alicyclic dienes include, but are not limited to 1,4-cyclohexadiene, 1,5-cyclooctadiene, and 1,7-cyclododecadiene. Examples of multi-ring alicyclic fused and bridged ring dienes include, but are not limited to tetrahydroindene; norbomadiene; methyl-tetrahydroindene; dicyclopentadiene; bicyclo-(2.2.1)-hepta-2,5-diene; and alkenyl-, alkylidene-, cycloalkenyl-, and cylcoalkyliene norbornenes [including, e.g., 5-methylene-2-norbornene, 5-ethylidene-2-norbornene, 5-propenyl-2-norbornene, 5-isopropylidene-2-norbornene, 5-(4-cyclopentenyl)-2-norbornene, 5-cyclohexylidene-2-norbornene, and 5-vinyl-2-norbornene]. Examples of cycloalkenyl-substituted alkenes include, but are not limited to vinyl cyclohexene, allyl cyclohexene, vinyl cyclooctene, 4-vinyl cyclohexene, allyl cyclodecene, vinyl cyclododecene, and tetracyclo (A-11,12)-5,8-dodecene.

Generally, olefins are present in the elastomeric phase of the heterogeneous polymer blend of the invention at levels from about 95 to about 99.99 wt %, whereas the diene content of the elastomeric copolymer is from about 0.01 wt % to about 5 wt %. But specific embodiments can have a variety of diene contents. Some embodiments have two or more different olefin units in the elastomeric component, with at least one monomer being selected from ethylene, propylene and $C_4$ to $C_{20}$ alpha-olefins. Typically, said at least one monomer unit comprises ethylene and a further monomer is selected from propylene and $C_4$ to $C_{12}$ alpha-olefins, especially propylene. These embodiments typically have one olefin present in amounts of from 12 to 98 wt %, for example from 30 to 95 wt %, of the copolymer whereas the other olefin is present in amounts of from 2 to 88 wt %, for example from 2 to 30 wt %, of the copolymer.

Still more desirably, the copolymer includes: ethylene units in the range from 2 wt % to 88 wt % of the copolymer; propylene or other α-olefin(s) units in the range from 98 wt % to 12 wt %, desirably ethylene units in the range from 5 to 20 wt % and propylene or other α-olefin(s) units in the range from 95 to 80 wt %; more desirably ethylene units in the range from 5 wt % to 15 wt % and propylene or other α-olefin(s) units in the range from 95 to 85 wt % of the copolymer.

During the second polymerization step to produce the elastomeric phase, it is believed that a distribution of cross-products are formed emanating principally from the grafting of the first thermoplastic polymer to the second elastomeric polymer. These hybrid cross-products, also known as branch-block copolymers, form when reactive intermediates (macromonomers) from the first polymerization step cross-over into the second polymerization step and participate in the polymerization of the second polymer. The presence of branch-block copolymers is believed to influence the events occurring during the polymerization as well as product properties. The extent of influence depends on the population distribution of the branch-block copolymer fraction.

The elastomeric second polymer is the continuous phase in the present heterogeneous polymer blend. In some cases, the elastomeric second polymer may be formed as finely divided particles and coated with the first polymer though the second polymer is visually the continuous phase in AFM images.

The amount of second polymer relative to the first polymer may vary widely depending on the nature of the polymers and the intended use of the final polymer blend. In particular, however, one advantage of the process of the invention is the ability to be able to produce a heterogeneous polymer blend in which the elastomeric second polymer comprise more than 50 wt %, such as more than 60 wt %, for example more than 70 wt % of the total heterogeneous polymer blend and the crystalline first polymer comprises less than 50 wt %, such as less than 30 wt %, for example less than 20 wt % of the total heterogeneous polymer blend. For TPV applications, the weight ratio of the second polymer to the first polymer is generally from about 90:10 to about 50:50, more preferably from about 80:20 to about 60:40.

Production of the Polymer Blend

The polymer blend is produced by a two-step polymerization process. In the first step, a crystalline thermoplastic polymer is produced by polymerizing at least one first monomer in one or more polymerization zones. The effluent from the first step is then fed into a second polymerization step where an elastomer is produced in the presence of the polymer produced in the first step. The elastomer is in-situ cross-linked, at least partially, in the second polymerization zone. It is believed that the cross-linked elastomer forms finely divided microgel particles that ensure that the polymer blend is thermo-processable.

In an alternative embodiment, the first step of polymerization is replaced with addition of pre-made crystalline thermoplastic polymer. The pre-made polymer can be produced in a separate system or can be a commercially available product. The crystalline thermoplastic polymer can be dissolved in a solvent and then added into a reaction medium for the second polymerization step. The crystalline thermoplastic polymer can be also ground into fine powder and then added into the reaction medium for the second polymerization step.

Any known polymerization process may be used to produce the thermoplastic polymer. For example, the polymer may be a propylene homopolymer obtained by homopolymerization of propylene in a single stage or multiple stage reactor. Copolymers may be obtained by copolymerizing propylene and an alpha-olefin having 2 or from 4 to 20 carbon atoms in a single stage or multiple stage reactor. Polymerization methods include high pressure, slurry, gas, bulk, suspension, supercritical, or solution phase, or a combination thereof, using a traditional Ziegler-Natta catalyst or a single-site metallocene catalyst system, or combinations thereof including bimetallic (i.e, Z/N and/or metallocene) catalysts. Preferred catalysts are those capable of polymerizing a $C_2$ to $C_{20}$ olefin to produce a first polymer having at least 30% crystallinity and at least 0.01% terminal unsaturation. The catalysts can be in the form of a homogeneous solution, supported, or a combination thereof Polymerization may be carried out by a continuous, a semi-continuous or batch process and may include use of chain transfer agents, scavengers, or other such additives as deemed applicable. By "continuous" is meant a system that operates (or is intended to operate) without interruption or cessation. For example a continuous process to produce a polymer would be one where the reactants are continually introduced into one or more reactors and polymer product is continually withdrawn.

Where the thermoplastic dispersed phase comprises a polyolefin, such as a propylene polymer or copolymer, the polyolefin will generally be produced in the presence of a single site catalyst, preferably a metallocene catalyst, with an activator and optional scavenger. Preferred metallocene catalysts are those capable of polymerizing a $C_2$ to $C_{20}$ olefin to produce a first polymer having at least 30% crystallinity.

Preferred metallocene catalysts useful for producing the thermoplastic first polymer in the process of the invention are not narrowly defined but generally it is found that the most suitable are those in the generic class of bridged, substituted bis(cyclopentadienyl) metallocenes, specifically bridged, substituted bis(indenyl) metallocenes known to produce high molecular weight, high melting, highly isotactic propylene polymers. Particularly suitable catalysts are bridged bis-indenyl metallocene catalysts having a substituent on one or both of the 2- and 4-positions on each indenyl ring or those having a substituent on the 2-, 4-, and 7-positions on each indenyl ring. Generally speaking, those of the generic class disclosed in U.S. Pat. No. 5,770,753 (fully incorporated herein by reference) should be suitable, however, it has been found that the exact polymer obtained is dependent on the metallocene's specific substitution pattern, among other things. A specific list of useful catalyst compounds is found in International Patent Publication No. WO 2004/026921 at page 29 paragraph [00100] to page 66, line 4. In another embodiment, the catalyst compounds described in International Patent Publication No. WO 2004/026921 at page 66, paragraph [00103] to page 70, line 3 may also be used in the practice of this invention.

Particularly preferred are racemic metallocenes, such as rac-dimethylsiladiyl(2-isopropyl,4-phenylindenyl)$_2$ zirconium dichloride; rac-dimethylsiladiyl(2-isopropyl,4-[1-naphthyl]indenyl)$_2$ zirconium dichloride; rac-dimethylsiladiyl(2-isopropyl,4-[3,5-dimethylphenyl]indenyl)$_2$ zirconium dichloride; rac-dimethylsiladiyl(2-isopropyl,4-[ortho-methyl-phenyl]indenyl)$_2$ zirconium dichloride; rac-dimethylsilyl bis-(2-methyl, 4-phenylindenyl)zirconium dichoride, rac dimethylsiladlyl bis-(2-methyl, 4-napthylindenyl) zirconium dichloride, rac-dimethyl siladiyl(2-isopropyl, 4-[3,5 di-t-butyl-phenyl]indenyl)$_2$ zirconium dichloride; rac-dimethyl siladiyl(2-isopropyl, 4-[orthophenyl-phenyl]indenyl)$_2$ zirconium dichloride, rac-diphenylsiladiyl(2-methyl-4-[1-naphthyl]indenyl)$_2$ zirconium dichloride and rac-biphenyl siladiyl(2-isopropyl, 4-[3,5 di-t-butyl-phenyl]indenyl)$_2$ zirconium dichloride. Alkylated variants of these metallocenes (e.g. dimethyl instead of dichloride) are also useful, particularly when combined with a non-coordinating anion type activator. These and other metallocene compositions are described in detail in U.S. Pat. Nos. 6,376,407, 6,376,408, 6,376,409, 6,376,410, 6,376,411, 6,376,412, 6,376,413, 6,376,627, 6,380,120, 6,380,121, 6,380,122, 6,380,123, 6,380,124, 6,380,330, 6,380,331, 6,380,334, 6,399,723 and 6,825,372.

The manner of activation of the catalyst used in the first polymerization step can vary. Alumoxane and preferably methyl alumoxane (MAO) can be used. Non-or weakly coordinating anion activators (NCA) may be obtained in any of the ways described in EP277004, EP426637. Activation generally is believed to involve abstraction of an anionic group such as the methyl group to form a metallocene cation, although according to some literature zwitterions may be produced. The NCA precursor can be an ion pair of a borate or aluminate in which the precursor cation is eliminated upon activation in some manner, e.g. trityl or ammonium derivatives of tetrakis pentafluorophenyl boron (See EP277004). The NCA precursor can be a neutral compound such as a borane, which is formed into a cation by the abstraction of and incorporation of the anionic group abstracted from the metallocene (See EP426638).

The alumoxane activator may be utilized in an amount to provide a molar aluminum to metallocene ratio of from 1:1 to 20,000:1 or more. The non-coordinating compatible anion activator may be utilized in an amount to provide a molar ratio of metallocene compound to non-coordinating anion of 10:1 to 1:1.

Particularly useful activators include dimethylanilinium tetrakis (pentafluorophenyl) borate and dimethyl anilinium tetrakis(heptafluoro-2-naphthyl) borate. For a more detailed description of useful activators, see International Patent Publication No. WO 2004/026921 at page 72, paragraph [00119] to page 81 paragraph [00151]. A list of particularly useful activators that can be used in the practice of this invention may be found at page 72, paragraph [00177] to page 74, paragraph [00178] of International Patent Publication No. WO 2004/046214.

Preferably, the first polymerization step is conducted in a continuous, stirred tank reactor. Tubular reactors equipped with the hardware to introduce feeds, catalysts and cross-linking agents in staged manner can also be used. Generally, polymerization reactors are agitated (stirred) to reduce or avoid concentration gradients. Reaction environments include the case where the monomer(s) acts as diluent or solvent as well as the case where a liquid hydrocarbon is used as diluent or solvent. Preferred hydrocarbon liquids include both aliphatic and aromatic fluids such as desulphurized light virgin naphtha and alkanes, such as propane, isobutane, mixed butanes, hexane, pentane, isopentane, cyclohexane, isooctane, and octane. In an alternate embodiment a perfluorocarbon or hydrofluorocarbon is used as the solvent or diluent.

Suitable conditions for the first polymerization step include a temperature from about 50 to about 250° C., preferably from about 50 to about 150° C., more preferably from about 70 to about 150° C. and a pressure of 0.1 MPa or more, preferably 2 MPa or more. The upper pressure limit is not critically constrained but is typically 200 MPa or less, preferably, 120 MPa or less, except when operating in supercritical phase then the pressure and temperature are above the critical point of the reaction media in question (typically over 95° C. and 4.6 MPa for propylene polymerizations). For more information on running supercritical polymerizations, see International Patent Publication No. WO 2004/026921. Temperature control in the reactor is generally obtained by balancing the heat of polymerization with reactor cooling via reactor jackets or cooling coils, auto refrigeration, pre-chilled feeds, vaporization of liquid medium (diluent, monomers or solvent) or combinations of all three. Adiabatic reactors with pre-chilled feeds may also be used.

In the second polymerization step, some or all of the first polymer formed in the first polymerization step is contacted with at least one second monomer, typically ethylene and a $C_3$ to $C_{20}$ olefin, and at least one cross-linking agent, typically a diene, under conditions sufficient to polymerize the second monomer(s) to produce the second polymer and also cross-link said second polymer. As a result of the cross-linking that occurs with the second polymerization step, the product of the second polymerization step contains at least a fraction which is insoluble in xylene. Preferably, the amount of said xylene insoluble fraction by weight of the second polymer, also referred to herein as the degree of cross-link of the second polymer, is at least 4%, such as at least 10%, such as at least 20%, such as at least 40%, such as at least 50%.

Any known polymerization process, including solution, suspension, slurry, supercritical and gas phase polymerization processes, and any known polymerization catalyst can be used to produce the second polymer component. Generally, the catalyst used to produce the second polymer component should be capable of polymerizing bulky monomers and also be capable of producing a polymer having an Mw of 20,000 or more and a crystallinity of less than 20%.

In one embodiment, the catalyst employed to produce the second polymer component is the same as, or is compatible with, the catalyst used to produce the thermoplastic first polymer. In such a case, the first and second polymerization zones can be in a multiple-zone reactor, or separate, series-connected reactors, with the entire effluent from the first polymerization zone, including any active catalyst, being transferred to the second polymerization zone. Additional catalyst can then be added, as necessary, to the second polymerization zone, in which case the elastomeric second polymer is derived from both the catalysts introduced into the first and the second polymerization zones. In a particularly preferred embodiment, the process of the invention is conducted in two or more series-connected, continuous flow, stirred tank or tubular reactors using metallocene catalysts.

In another embodiment, catalyst quenching is applied between the two polymerization zones and a separate catalyst is introduced in the second reaction zone to produce the elastomer component. Catalyst quenching agents (such as air or an alcohol) may be introduced into the effluent from the first polymerization zone right after the reactor exit to deactivate the catalyst used for the first polymerization. Scavengers may be useful and can be fed into the effluent downstream of the catalyst quenching agent injection point or the second polymerization zone.

Where a separate catalyst is used to produce the elastomeric second polymer, this is conveniently one of, or a mixture of, metallocene compounds of either or both of the following types:

1) Cyclopentadienyl (Cp) complexes which have two Cp ring systems for ligands. The Cp ligands form a sandwich complex with the metal and can be free to rotate (unbridged) or locked into a rigid configuration through a bridging group. The Cp ring ligands can be like or unlike, unsubstituted, substituted, or a derivative thereof such as a heterocyclic ring system which may be substituted, and the substitutions can be fused to form other saturated or unsaturated rings systems such as tetrahydroindenyl, indenyl, or fluorenyl ring systems. These cyclopentadienyl complexes are represented by the formula

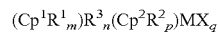

wherein $Cp^1$ of ligand $(Cp^1R^1{}_m)$ and $Cp^2$ of ligand $(Cp^2R^2{}_p)$ are the same or different cyclopentadienyl rings, $R^1$ and $R^2$ each is, independently, a halogen or a hydrocarbyl, halocarbyl, hydrocarbyl-substituted organometalloid or halocarbyl-substituted organometalloid group containing up to about 20 carbon atoms, m is 0, 1, 2, 3, 4, or 5, p is 0, 1, 2, 3, 4 or 5, and two $R^1$ and/or $R^2$ substituents on adjacent carbon atoms of the cyclopentadienyl ring associated there with can be joined together to form a ring containing from 4 to about 20 carbon atoms, $R^3$ is a bridging group, n is the number of atoms in the direct chain between the two ligands and is 0, 1, 2, 3, 4, 5, 6, 7, or 8, preferably 0, 1, 2, or 3, M is a transition metal having a valence of 3, 4, 5 or 6, preferably from Group 4, 5, or 6 of the Periodic Table of the Elements and is preferably in its highest oxidation state, each X is a non-cyclopentadienyl ligand and is, independently, a halogen or a hydrocarbyl, oxyhydrocarbyl, halocarbyl, hydrocarbyl-substituted organometalloid, oxyhydrocarbyl-substituted organometalloid or halocarbyl-substituted organometalloid group containing up to about 20 carbon atoms, q is equal to the valence of M minus 2.

2) Monocyclopentadienyl complexes which have only one Cp ring system as a ligand. The Cp ligand forms a half-sandwich complex with the metal and can be free to rotate (unbridged) or locked into a rigid configuration through a bridging group to a heteroatom-containing ligand. The Cp ring ligand can be unsubstituted, substituted, or a derivative thereof such as a heterocyclic ring system which may be substituted, and the substitutions can be fused to form other saturated or unsaturated rings systems such as tetrahydroindenyl, indenyl, or fluorenyl ring systems. The heteroatom containing ligand is bound to both the metal and optionally to the Cp ligand through the bridging group. The heteroatom itself is an atom with a coordination number of three from Group 15 or 16 of the periodic table of the elements. These mono-cyclopentadienyl complexes are represented by the formula $$(Cp^1R^1{}_m)R^3{}_n(YR^2)MX_s$$

wherein $R^1$ is, each independently, a halogen or a hydrocarbyl, halocarbyl, hydrocarbyl-substituted organometalloid or halocarbyl-substituted organometalloid group containing up to about 20 carbon atoms, m is 0, 1, 2, 3, 4 or 5, and two $R^1$ substituents on adjacent carbon atoms of the cyclopentadienyl ring associated therewith can be joined together to form a ring containing from 4 to about 20 carbon atoms, $R^3$ is a bridging group, n is 0, or 1, M is a transition metal having a valence of from 3, 4, 5, or 6, preferably from Group 4, 5, or 6 of the Periodic Table of the Elements and is preferably in its highest oxidation state, Y is a heteroatom containing group in which the heteroatom is an element with a coordination number of three from Group 15 or a coordination number of two from Group 16 preferably nitrogen, phosphorous, oxygen, or sulfur, $R^2$ is a radical independently selected from a group consisting of $C_1$ to $C_{20}$ hydrocarbon radicals, substituted $C_1$ to $C_{20}$ hydrocarbon radicals, wherein one or more hydrogen atoms is replaced with a halogen atom, and when Y is three coordinate and unbridged there may be two $R_2$ groups on Y each independently a radical selected from a group consisting of $C_1$ to $C_{20}$ hydrocarbon radicals, substituted $C_1$ to $C_{20}$ hydrocarbon radicals, wherein one or more hydrogen atoms is replaced with a halogen atom, and each X is a non-cyclopentadienyl ligand and is, independently, a halogen or a hydrocarbyl, oxyhydrocarbyl, halocarbyl, hydrocarbyl-substituted organometalloid, oxyhydrocarbyl-substituted organometalloid or halocarbyl-substituted organometalloid group containing up to about 20 carbon atoms, s is equal to the valence of M minus 2; $Cp^1$ is a Cp ring.

Examples of suitable biscyclopentadienyl metallocenes of the type described in Group 1 above for the invention are disclosed in U.S. Pat. Nos. 5,324,800; 5,198,401; 5,278,119; 5,387,568; 5,120,867; 5,017,714; 4,871,705; 4,542,199; 4,752,597; 5,132,262; 5,391,629; 5,243,001; 5,278,264; 5,296,434; and 5,304,614, all of which are incorporated by reference herein.

Illustrative, but not limiting examples of preferred biscyclopentadienyl metallocenes of the type described in Group 1 above for the invention are the racemic isomers of:

μ-(CH$_3$)$_2$Si(indenyl)$_2$M(Cl)$_2$
μ-(CH$_3$)$_2$Si(indenyl)$_2$M(CH$_3$)$_2$
μ-(CH$_3$)$_2$Si(tetrahydroindenyl)$_2$M(Cl)$_2$
μ-(CH$_3$)$_2$Si(tetrahydroindenyl)$_2$M(CH$_3$)$_2$
μ-(CH$_3$)$_2$Si(indenyl)$_2$M(CH$_2$CH$_3$)$_2$
μ-(C$_6$H$_5$)$_2$C(indenyl)$_2$M(CH$_3$)$_2$ wherein M is chosen from a group consisting of Zr and Hf.

Examples of suitable unsymmetrical cyclopentadienyl metallocenes of the type described in Group 1 above for the invention are disclosed in U.S. Pat. Nos. 4,892,851; 5,334,677; 5,416,228; and 5,449,651; and are described in publication *J Am. Chem. Soc.* 1988, 110, 6255, all of which are incorporated by reference herein.

Illustrative, but not limiting examples of preferred unsymmetrical cyclopentadienyl metallocenes of the type described in Group 1 above for the invention are:

μ-(C$_6$H$_5$)$_2$C(cyclopentadienyl)(fluorenyl)M(R)$_2$
μ-(C$_6$H$_5$)$_2$C(3-methylcyclopentadienyl)(fluorenyl)M(R)$_2$
μ-(CH$_3$)$_2$C(cyclopentadienyl)(fluorenyl)M(R)$_2$
μ-(C$_6$H$_5$)$_2$C(cyclopentadienyl)(2-methylindenyl)M(R)$_2$
μ-(C$_6$H$_5$)$_2$C(3-methylcyclopentadienyl)(2-methylindenyl)M(R)$_2$
μ-(p-triethylsilylphenyl)$_2$C(cyclopentadienyl)(3,8-di-t-butylfluorenyl) M(R)$_2$
μ-(C$_6$H$_5$)$_2$C(cyclopentadienyl)(2,7-dimethylindenyl)M(R)$_2$
μ-(CH$_3$)$_2$C(cyclopentadienyl)(2,7-dimethylindenyl)M(R)$_2$.

wherein M is chosen from the group consisting of Zr and Hf and R is chosen from the group consisting of Cl and CH$_3$.

Examples of suitable monocyclopentadienyl metallocenes of the type described in group 2 above for the invention are disclosed in U.S. Pat. Nos. 5,026,798; 5,057,475; 5,350,723; 5,264,405; 5,055,438 and are described in International Patent Publication No. WO 96/002244, all of which are incorporated by reference herein.

Illustrative, but not limiting examples of preferred monocyclopentadienyl metallocenes of the type described in group 2 above for the invention are:

μ-(CH$_3$)$_2$Si(cyclopentadienyl)(1-adamantylamido)M(R)$_2$
μ-(CH$_3$)$_2$Si(3-tertbutylcyclopentadienyl)(1-adamantylamido)M(R)$_2$
μ-(CH$_3$)$_2$Si(tetramethylcyclopentadienyl)(1-adamantylamido)M(R)$_2$
μ-(CH$_3$)$_2$C(tetramethylcyclopentadienyl)(1-adamantylamido)M(R)$_2$
μ-(CH$_3$)$_2$Si(tetramethylcyclopentadienyl)(1-tertbutylamido)M(R)$_2$
μ-(CH$_3$)$_2$Si(fluorenyl)(1-tertbutylamido)M(R)$_2$
μ-(CH$_3$)$_2$Si(tetramethylcyclopentadienyl)(1-cyclododecylamido)M(R)$_2$
μ-(CH$_3$)$_2$C(tetramethylcyclopentadienyl)(1-cyclododecylamido)M(R)$_2$ wherein M is selected from a group consisting of Ti, Zr, and Hf and wherein R is selected from Cl and CH$_3$.

Another class of organometallic complexes that are useful catalysts for producing the second polymer component are those with diimido ligand systems such as those described in International Patent Publication No. WO 96/23010, the entire contents of which are incorporated herein by reference.

The conditions in the second polymerization zone are arranged not only to copolymerize the elastomer monomers with the bifunctional monomer, such as a diene, but also to cause at least partial cross-linking of resultant elastomer. Typical conditions in the second polymerization zone include a temperature of about 10° C. to about 250° C. and a pressure of about 0.1 MPa to about 200 MPa.

The second polymer, which is at least partially cross-linked in the copolymerization reaction of olefins and dienes, may be prepared by solution, suspension or slurry polymerization of the olefins and diene under conditions in which the catalyst site remains relatively insoluble and/or immobile so that the polymer chains are rapidly immobilized following their formation. Such immobilization is affected, for example, by (1) using a solid, insoluble catalyst, (2) maintaining the polymerization below the crystalline melting point of thermoplastic polymers made in the first step and (3) using low solvency solvent such as a fluorinated hydrocarbon.

In a solution/suspension process, the uncrosslinked second polymers are dissolved (or are soluble) in the polymerization media. The second polymers are then phase separated from the reaction media to form micro-particles when the polymers are cross-linked. This in-situ cross-link and phase separation facilitates the process to produce polymers of high molecular weight.

By selecting the catalyst systems (i.e., catalyst and activator), the polymerization reaction conditions, and/or by introducing a diene modifier, some molecules of the first polymer(s) and the second polymer(s) can be linked together to produce branch-block structures. While not wishing to be bound by theory, the branch-block copolymer is believed to comprise an amorphous backbone having crystalline side chains originating from the first polymer.

To effectively incorporate the polymer chains of the first polymer into the growing chains of the second polymer, it is preferable that the first polymerization step produces macromonomers having reactive termini, such as vinyl end groups. By macromonomers having reactive termini is meant a polymer having twelve or more carbon atoms (preferably 20 or more, more preferably 30 or more, more preferably between 12 and 8000 carbon atoms) and having a vinyl, vinylidene, vinylene or other terminal group that can be polymerized into a growing polymer chain. By capable of polymerizing macromonomer having reactive termini is meant a catalyst component that can incorporate a macromonomer having reactive termini into a growing polymer chain. Vinyl terminated chains are generally more reactive than vinylene or vinylidene terminated chains. Generally, it is desirable that the first polymerization step produces a first polymer having at least 0.01% terminal unsaturation.

Optionally the thermoplastic first polymers are copolymers of one or more alpha olefins and one or more of monomers having at least two olefinically unsaturated bonds. Both of these unsaturated bonds are suitable for and readily incorporated into a growing polymer chain by coordination polymerization using either the first or second catalyst systems independently such that one double bond is incorporated into the first polymer segments while another double bond is incorporated into the second elastomeric polymer segments to form a branched block copolymer. In a preferred embodiment these monomers having at least two olefinically unsaturated bonds are di-olefins, preferably di-vinyl monomers.

Polymers with bimodal distributions of molecular weight and composition can be produced by the polymerization process of the invention, by, for example, controlling the polymerization conditions in the first and the second polymerization zones and selecting the catalysts for the first and the second polymerizations, such as by using multiple catalysts in each polymerization zone.

A polymer can be recovered from the effluent of either the first polymerization step or the second polymerization step by separating the polymer from other constituents of the effluent using conventional separation means. For example, polymer can be recovered from either effluent by coagulation with a non-solvent such as isopropyl alcohol, acetone, or n-butyl alcohol, or the polymer can be recovered by stripping the solvent or other media with heat or steam. One or more conventional additives such as antioxidants can be incorporated in the polymer during the recovery procedure. Possible antioxidants include phenyl-beta-naphthylamine; di-tert-butylhydroquinone, triphenyl phosphate, heptylated diphenylamine, 2,2'-methylene-bis(4-methyl-6-tert-butyl)phenol, and 2,2,4-trimethyl-6-phenyl-1,2-dihydroquinoline. Other methods of recovery such as by the use of lower critical solution temperature (LCST) followed by devolatilization are also envisioned. The catalyst may be deactivated as part of the separation procedure to reduce or eliminate further uncontrolled polymerization downstream the polymer recovery processes. Deactivation may be effected by the mixing with suitable polar substances such as water, whose residual effect following recycle can be counteracted by suitable sieves or scavenging systems.

Properties of the Polymer Blend

By virtue of the novel polymerization process used in its production, the heterogeneous polymer blend of the invention not only comprises particles of the first polymer dispersed within a matrix of the second polymer but also at least a portion the continuous phase is cross-linked and preferably comprises a hybrid species of said first and second polymers having characteristics of the first and second polymers such as a melting temperature, preferably of at least 100° C., in the xylene insoluble fraction.

The heterogeneous polymer blends are thermo-processable by conventional plastic processing techniques such as injection molding, extrusion and compression molding despite the factor that the elastomer is at least partially cross-linked. The continuous phase of the heterogeneous polymer blend of the invention comprises at least a fraction which is insoluble in xylene and which is substantially free of the curatives normally added to polymers blends to effect cross-linking during post-polymerization, dynamic extrusion. By substantially free is meant that the continuous phase contains less than 1,000 ppm, such as less than 100 ppm, such as less than 10 ppm, of a curative.

Since the present heterogeneous polymer blends are composed predominantly of the elastomeric second polymer, articles produced therefrom are soft and smooth in touch even without oil addition.

The individual components of the heterogeneous polymer blend of the invention can readily be separated by solvent extraction. In a suitable solvent extraction regime, the blend, without undergoing any additional processing steps, is contacted with cyclohexane at 25° C. for 48 hours to dissolve the uncross-linked and branched elastomeric components of the blend and then the remaining solids are refluxed at the boiling temperature of xylene for 24 hours with xylene to dissolve the thermoplastic phase material. The remaining xylene insolubles comprise the cross-linked second polymer and hybrid copolymers of the first and second polymers. These hybrid copolymers typically exhibit a melting temperature in excess of 100° C.

In one embodiment, the polymer blend described herein has a tensile strength at break (as measured by ISO 37 at 23° C.) of 0.5 MPa or more, alternatively 0.75 MPa or more, alternatively 1.0 MPa or more, alternatively 1.5 MPa or more, alternatively 2.0 MPa or more, alternatively 2.5 MPa or more, alternatively 3.0 MPa or more, alternatively 3.5 MPa or more.

In another embodiment, the polymer blend described herein has a Shore hardness of 2 A to 90 A, preferably 15 A to 70 A (as measured by ISO 868).

In another embodiment, the polymer blend described herein has an ultimate elongation (as measured by ISO 37) of 20% or more, preferably 30% or more, more preferably 40% or more.

In another embodiment, the polymer blend described herein has a compression set (as measured by ISO 815 A) of 90% or less, preferably 70% or less, more preferably 50% or less, more preferably 30% or less, In another embodiment, the polymer blend described herein has a tension set (as measured by ISO 2285) of 100% or less, preferably 80% or less, more preferably 60% or less, more preferably 20% or less.

In another embodiment, the polymer blend described herein has an oil swell (as measured by ASTM D471) of 500% or less, preferably 250% or less, more preferably 100% or less.

Additives

The heterogeneous polymer blend according to the invention may optionally contain reinforcing and non-reinforcing fillers, plasticizers, antioxidants, stabilizers, rubber processing oils, extender oils, lubricants, antiblocking agents, antistatic agents, waxes, foaming agents, pigments, flame retardants and other processing aids known in the rubber compounding art. Such additives may comprise up to about 70 weight percent, more preferably up to about 65 weight percent, of the total composition. Suitable fillers and extenders include conventional inorganics such as calcium carbonate, clays, silica, talc, titanium dioxide, carbon black and the like. Suitable rubber processing oils generally are paraffinic, naphthenic or aromatic oils derived from petroleum fractions. The oils are selected from those ordinarily used in conjunction with the specific rubber or rubber component present in the composition.

The additives such as fillers and oils can be introduced into the heterogeneous polymer blend during the polymerization in either the first polymerization zone or the second polymerization zone. The additives can be added into the effluent from the second polymerization zone and are preferably added into the polymer blend after removal of solvent or diluent through melt blending.

Additional polymers can also be added to form blends. In one or more embodiments, the additional polymers include thermoplastic resins. Exemplary thermoplastic resins include crystalline polyolefins. Also, suitable thermoplastic resins may include copolymers of polyolefins with styrene, such as a styrene-ethylene copolymer. In one or more embodiments, the thermoplastic resins are formed by polymerizing ethylene or $\alpha$-olefins such as propylene, 1-butene, 1-hexene, 1-octene, 2-methyl-1-propene, 3-methyl-1-pentene, 4-methyl-1-pentene, 5-methyl-1-hexene, and mixtures thereof Copolymers of ethylene and propylene and ethylene and propylene with another $\alpha$-olefin such as 1-butene, 1-hexene, 1-octene, 2-methyl-1-propene, 3-methyl-1-pentene, 4-methyl-1-pentene, 5-methyl-1-hexene or mixtures thereof are also contemplated. Also suitable are homopolypropylene, as well as impact and random copolymers of propylene with ethylene or the higher $\alpha$-olefins, described above, or with $C_{10}$-$C_{20}$ diolefins. Preferably, the homopolypropylene has a melting point of at least 130° C., for example at least 140° C. and preferably less than or equal to 170° C., a heat of fusion of at least 75 J/g, alternatively at least 80 J/g, as determined by DSC analysis, and weight average molecular weight (Mw) of at least 50,000, alternatively at least 100,000. Comonomer contents for the propylene copolymers will typically be from 1 to about 30% by weight of the polymer, for example, see U.S. Pat. Nos. 6,268,438, 6,288,171, and 6,245,856. Copolymers available under the tradename VISTAMAXX™ (ExxonMobil) are specifically included. Blends or mixtures of two or more polyolefin thermoplastics such as described herein, or with other polymeric modifiers, are also suitable in accordance with this invention. These homopolymers and copolymers may be synthesized by using an appropriate polymerization technique known in the art such as, but not limited to, the conventional Ziegler-Natta type polymerizations, and catalysis employing single-site organometallic catalysts including, but not limited to, metallocene catalysts.

In one or more embodiments, the polyene employed in the second polymerization step can be selected such that any pendant double bonds left unreacted after production of the second polymer can undergo curing during the finishing operation and thereby increase the crosslink density of the rubber phase.

In one or more embodiments, during the finishing step curing agents can be injected into the polymer finishing equipment to increase the cure density of the continuous rubber phase. Exemplary curatives include phenolic resin cure systems, peroxide cure systems, and silicon-containing cure systems.

In one or more embodiments, the phenolic resin curatives include those disclosed in U.S. Pat. Nos. 2,972,600, 3,287,440, 5,952,425 and 6,437,030, and International Application No. PCT/US04/30518, the entire contents of which are incorporated herein by reference.

Phenolic resin curatives can be referred to as resole resins, and include those resins made by the condensation of alkyl substituted phenols or unsubstituted phenols with aldehydes, such as formaldehydes, in an alkaline medium or by condensation of bi-functional phenoldialcohols. The alkyl substituents of the alkyl substituted phenols may contain 1 to about 10 carbon atoms. Dimethylolphenols or phenolic resins, substituted in para-positions with alkyl groups containing 1 to about 10 carbon atoms are preferred. In one embodiment, a blend of octyl phenol and nonylphenol-formaldehyde resins are employed. The blend may include from about 25 to about 40% by weight octyl phenol and from about 75 to about 60% by weight nonylphenol (optionally from about 30 to about 35 weight percent octyl phenol and from about 70 to about 65 weight percent nonylphenol). In one embodiment, the blend includes about 33% by weight octylphenol-formaldehyde and about 67% by weight nonylphenol formaldehyde resin, where each of the octylphenol and nonylphenol include methylol groups. This blend can be solubilized in paraffinic oil at about 30% solids.

Useful phenolic resins may be obtained under the tradenames SP-1044, SP-1045 (Schenectady International; Schenectady, N.Y.), which are referred to as alkylphenol-formaldehyde resins. SP-1045 is believed to be an octylphenol-formaldehyde resin that contains methylol groups. The SP-1044 and SP-1045 resins are believed to be essentially free of halogen substituents or residual halogen compounds. By essentially free of halogen substituents, it is meant that the synthesis of the resin provides for a non-halogenated resin that may only contain trace amounts of halogen containing compounds.

Alternatively, the phenolic resin can be used in combination with the halogen source, such as stannous chloride, and a metal oxide or reducing compound such as zinc oxide.

In one or more embodiments, useful peroxide curatives include organic peroxides. Examples of organic peroxides include, but are not limited to, di-tert-butyl peroxide, dicumyl peroxide, t-butylcumyl peroxide, $\alpha,\alpha$-bis(tert-butylperoxy) diisopropyl benzene, 2,5-dimethyl-2,5-di(t-butylperoxy) hexane (DBPH), 1,1-di(tert-butylperoxy)-3,3,5-trimethyl cyclohexane, n-butyl-4-4-bis(tert-butylperoxy)valerate, benzoyl peroxide, lauroyl peroxide, dilauroyl peroxide, 2,5-dimethyl-2,5-di(tert-butylperoxy) hexyne-3, and mixtures thereof. Also, diaryl peroxides, ketone peroxides, peroxydicarbonates, peroxyesters, dialkyl peroxides, hydroperoxides, peroxyketals and mixtures thereof may be used. Useful peroxides and their methods of use in dynamic vulcanization of thermoplastic vulcanizates are disclosed in U.S. Pat. No. 5,656,693, the entire contents of which are incorporated herein by reference.

In one or more embodiments, the peroxide curatives are employed in conjunction with a coagent. Examples of coagents include triallylcyanurate, triallyl isocyanurate, triallyl phosphate, sulfur, N-phenyl bis-maleamide, zinc diacrylate, zinc dimethacrylate, divinyl benzene, 1,2 polybutadiene, trimethylol propane trimethacrylate, tetramethylene glycol diacrylate, trifunctional acrylic ester, dipentaerythritolpentacrylate, polyfunctional acrylate, retarded cyclohexane dimethanol diacrylate ester, polyfunctional methacrylates, acrylate and methacrylate metal salts, oximer for e.g., quinone dioxime. In order to maximize the efficiency of peroxide/coagent crosslinking the mixing and dynamic vulcanization are preferably carried out in a nitrogen atmosphere.

In one or more embodiments, useful silicon-containing cure systems include silicon hydride compounds having at least two SiH groups. It is believed that these compounds react with carbon-carbon double bonds of unsaturated polymers in the presence of a hydrosilation catalyst. Silicon hydride compounds that are useful in practicing the present invention include, but are not limited to, methylhydrogen polysiloxanes, methylhydrogen dimethyl-siloxane copolymers, alkyl methyl polysiloxanes, bis(dimethylsilyl)alkanes, bis(dimethylsilyl)benzene, and mixtures thereof.

Useful catalysts for hydrosilation include, but are not limited to, peroxide catalysts and catalysts including transition metals of Group VIII. These metals include, but are not limited to, palladium, rhodium, and platinum, as well as complexes of these metals. For a further discussion of the use of hydrosilation to cure thermoplastic vulcanizates, reference can be made to U.S. Pat. No. 5,936,028, which is incorporated herein by reference. In one or more embodiments, a silicon-containing curative can be employed to cure an elastomeric copolymer including units deriving from 5-vinyl-2-norbornene.

In one or more embodiments, curatives that are useful for curing the inventive polymer blend include those described in U.S. Pat. Nos. 5,013,793, 5,100,947, 5,021,500, 4,978,714, and 4,810,752, which are incorporated herein by reference.

Uses of the Polymer Blends

Despite the fact that the elastomer is at least partially crosslinked, the compositions of this invention can be processed and reprocessed by conventional plastic processing techniques such as extrusion, injection molding, and compression molding. The elastomer within these heterogeneous blends is usually in the form of finely-divided particles, even though they are visually in the continuous morphology phase in the solid-state.

The heterogeneous polymer blends described herein may be shaped into desirable end use articles by any suitable means known in the art. They are particularly useful for making articles by blow molding, extrusion, injection molding, thermoforming, gas foaming, elasto-welding and compression molding techniques.

Thermoforming is a process of forming at least one pliable plastic sheet into a desired shape. An embodiment of a thermoforming sequence is described, however this should not be construed as limiting the thermoforming methods useful with the compositions of this invention. First, an extrudate film of the composition of this invention (and any other layers or materials) is placed on a shuttle rack to hold it during heating. The shuttle rack indexes into the oven which pre-heats the film before forming Once the film is heated, the shuttle rack indexes back to the forming tool. The film is then vacuumed onto the forming tool to hold it in place and the forming tool is closed. The forming tool can be either "male" or "female" type tools. The tool stays closed to cool the film and the tool is then opened. The shaped laminate is then removed from the tool.

Thermoforming is accomplished by vacuum, positive air pressure, plug-assisted vacuum forming, or combinations and variations of these, once the sheet of material reaches thermoforming temperatures, typically of from 140° C. to 185° C. or higher. A pre-stretched bubble step is used, especially on large parts, to improve material distribution. In one embodiment, an articulating rack lifts the heated laminate towards a male forming tool, assisted by the application of a vacuum from orifices in the male forming tool. Once the laminate is firmly formed about the male forming tool, the thermoformed shaped laminate is then cooled, typically by blowers. Plug-assisted forming is generally used for small, deep drawn parts. Plug material, design, and timing can be critical to optimization of the process. Plugs made from insulating foam avoid premature quenching of the plastic. The plug shape is usually similar to the mold cavity, but smaller and without part detail. A round plug bottom will usually promote even material distribution and uniform side-wall thickness.

The shaped laminate is then cooled in the mold. Sufficient cooling to maintain a mold temperature of 30° C. to 65° C. is desirable. The part is below 90° C. to 100° C. before ejection in one embodiment. For the good behavior in thermoforming, the lowest melt flow rate polymers are desirable. The shaped laminate is then trimmed of excess laminate material.

Blow molding is another suitable forming means, which includes injection blow molding, multi-layer blow molding, extrusion blow molding, and stretch blow molding, and is especially suitable for substantially closed or hollow objects, such as, for example, gas tanks and other fluid containers. Blow molding is described in more detail in, for example, CONCISE ENCYCLOPEDIA OF POLYMER SCIENCE AND ENGINEERING 90-92 (Jacqueline I. Kroschwitz, ed., John Wiley & Sons 1990).

In yet another embodiment of the formation and shaping process, profile co-extrusion can be used. The profile co-extrusion process parameters are as above for the blow molding process, except the die temperatures (dual zone top and bottom) range from 150° C. to 235° C., the feed blocks are from 90° C. to 250° C., and the water cooling tank temperatures are from 10° C. to 40° C.

One embodiment of an injection molding process is described as follows. The shaped laminate is placed into the injection molding tool. The mold is closed and the substrate material is injected into the mold. The substrate material has a melt temperature between 200° C. and 300° C., such as between 215° C. and 250° C. and is injected into the mold at an injection speed of between 2 and 10 seconds. After injection, the material is packed or held at a predetermined time and pressure to make the part dimensionally and aesthetically correct. Typical time periods are from 5 to 25 seconds and pressures from 1,380 kPa to 10,400 kPa. The mold is cooled between 10° C. and 70° C. to cool the substrate. The temperature will depend on the desired gloss and appearance desired. Typical cooling time is from 10 to 30 seconds, depending on part on the thickness. Finally, the mold is opened and the shaped composite article ejected.

Likewise, molded articles may be fabricated by injecting molten polymer into a mold that shapes and solidifies the molten polymer into desirable geometry and thickness of molded articles. Sheet may be made either by extruding a substantially flat profile from a die, onto a chill roll, or alternatively by calendaring. Sheet will generally be considered to have a thickness of from 10 mils to 100 mils (254 μm to 2540

μm), although sheet may be substantially thicker. Tubing or pipe may be obtained by profile extrusion for uses in medical, potable water, land drainage applications or the like. The profile extrusion process involves the extrusion of molten polymer through a die. The extruded tubing or pipe is then solidified by chill water or cooling air into a continuous extruded articles. The tubing will generally be in the range of from 0.31 cm to 2.54 cm in outside diameter, and have a wall thickness of in the range of from 254 cm to 0.5 cm. The pipe will generally be in the range of from 2.54 cm to 254 cm in outside diameter, and have a wall thickness of in the range of from 0.5 cm to 15 cm. Sheet made from the products of an embodiment of a version of the present invention may be used to form containers. Such containers may be formed by thermoforming, solid phase pressure forming, stamping and other shaping techniques. Sheets may also be formed to cover floors or walls or other surfaces.

In an embodiment of the thermoforming process, the oven temperature is between 160° C. and 195° C., the time in the oven between 10 and 20 seconds, and the die temperature, typically a male die, between 10° C. and 71° C. The final thickness of the cooled (room temperature), shaped laminate is from 10 μm to 6000 μm in one embodiment, from 200 μm to 6000 μm in another embodiment, and from 250 μm to 3000 μm in yet another embodiment, and from 500 μm to 1550 μm in yet another embodiment, a desirable range being any combination of any upper thickness limit with any lower thickness limit.

In an embodiment of the injection molding process, wherein a substrate material is injection molded into a tool including the shaped laminate, the melt temperature of the substrate material is between 230° C. and 255° C. in one embodiment, and between 235° C. and 250° C. in another embodiment, the fill time from 2 to 10 seconds in one embodiment, from 2 to 8 seconds in another embodiment, and a tool temperature of from 25° C. to 65° C. in one embodiment, and from 27° C. and 60° C. in another embodiment. In a desirable embodiment, the substrate material is at a temperature that is hot enough to melt any tie-layer material or backing layer to achieve adhesion between the layers.

In yet another embodiment of the invention, the compositions of this invention may be secured to a substrate material using a blow molding operation. Blow molding is particularly useful in such applications as for making closed articles such as fuel tanks and other fluid containers, playground equipment, outdoor furniture and small enclosed structures. In one embodiment of this process, Compositions of this invention are extruded through a multi-layer head, followed by placement of the uncooled laminate into a parison in the mold. The mold, with either male or female patterns inside, is then closed and air is blown into the mold to form the part.

It will be understood by those skilled in the art that the steps outlined above may be varied, depending upon the desired result. For example, an extruded sheet of the compositions of this invention may be directly thermoformed or blow molded without cooling, thus skipping a cooling step. Other parameters may be varied as well in order to achieve a finished composite article having desirable features.

The thermoplastic elastomer blends of this invention are useful for making a variety of articles such as weather seals, hoses, belts, gaskets, moldings, boots, elastic fibers and like articles. Foamed end-use articles are also envisioned. More specifically, the blends of the invention are particularly useful for making vehicle parts, such as but not limited to, weather seals, brake parts including, but not limited to cups, coupling disks, diaphragm cups, boots such as constant velocity joints and rack and pinion joints, tubing, sealing gaskets, parts of hydraulically or pneumatically operated apparatus, o-rings, pistons, valves, valve seats, valve guides, and other elastomeric polymer based parts or elastomeric polymers combined with other materials such as metal, plastic combination materials which will be known to those of ordinary skill in the art. Also contemplated are transmission belts including V-belts, toothed belts with truncated ribs containing fabric faced V's, ground short fiber reinforced Vs or molded gum with short fiber flocked V's. The cross section of such belts and their number of ribs may vary with the final use of the belt, the type of market and the power to transmit. They also can be flat made of textile fabric reinforcement with frictioned outside faces. Vehicles contemplated where these parts will find application include, but are not limited to passenger autos, motorcycles, trucks, boats and other vehicular conveyances.

In another embodiment, this invention relates to:

1. A heterogeneous polymer blend comprising:
   (a) a dispersed phase comprising a thermoplastic first polymer having a crystallinity of at least 30%; and
   (b) a continuous phase comprising a second polymer different from the first polymer, the second polymer having a crystallinity of less than 20% and being at least partially cross-linked.

2. The polymer blend of paragraph 1 wherein said second polymer is at least partially cross-linked such that at least a fraction of said continuous phase is insoluble in xylene.

3. The polymer blend of paragraph 2 wherein said fraction insoluble in xylene comprises at least 5% by weight, preferably at least 20% by weight, of said continuous phase.

4. The polymer blend of any of paragraphs 1 to 3 wherein said dispersed phase comprises particles of said thermoplastic first polymer having an average particle size less than 10 microns, preferably less than 5 microns.

5. The polymer blend of any of paragraphs 1 to 4 wherein said dispersed phase comprises less than 50% by weight, preferably less than 30% by weight, of the total heterogeneous polymer blend.

6. The polymer blend of any of paragraphs 1 to 5 wherein said thermoplastic first polymer is a homopolymer of a $C_2$ to $C_{20}$ olefin.

7. The polymer blend of any of paragraphs 1 to 5 wherein said thermoplastic first polymer is a copolymer of a $C_2$ to $C_{20}$ olefin with less than 15 wt % of at least one comonomer.

8. The polymer blend of any of paragraphs 1 to 7 wherein said thermoplastic first polymer comprises a polymer of propylene.

9. The polymer blend of any of paragraphs 1 to 8 wherein the second polymer is produced from a plurality of comonomers comprising at least one $C_3$ to $C_{20}$ olefin and at least one polyene.

10. The polymer blend of paragraph 9 wherein said at least one polyene has at least two polymerizable unsaturated groups.

11. The polymer blend of paragraph 9 or paragraph 10 wherein said plurality of comonomers comprise propylene and ethylene.

12. The polymer blend of any of paragraphs 1 to 11 wherein the blend is substantially free of processing oil and curative.

13. The polymer blend of any of paragraphs 1 to 11 wherein said continuous phase comprises a curative such that no more than about 50 wt % of the second polymer is extractable in cyclohexane at 23° C.

14. The polymer blend of paragraph 13 wherein said curative is selected from a phenolic resin, a peroxide and a silicon-containing curative.

15. The polymer blend of any of paragraphs 1 to 14 and further including one or more additives selected from fillers, extenders, plasticizers, antioxidants, stabilizers, oils, lubricants, and additional polymers.

16. A process for producing the polymer blend of any of paragraphs 1 to 15, the process comprising:

(i) polymerizing at least one first monomer to produce the thermoplastic first polymer;

(ii) contacting at least part of said first polymer with at least one second monomer and at least one polyene under conditions sufficient to polymerize said second monomer to produce, and simultaneously cross-link, said second polymer as finely divided particles.

17. The process of paragraph 16 wherein said polymerizing (i) is conducted in the presence of a catalyst and said contacting (ii) is conducted in the presence of the same catalyst.

18. The process of paragraph 16 wherein said polymerizing (i) is conducted in the presence of a first catalyst and said contacting (ii) is conducted in the presence of a second catalyst different from the first catalyst.

19. The process of any one of paragraphs 16 to 18 wherein the first polymer produced in said polymerizing (i) has at least 0.01% terminal unsaturation.

20. The process of any one of paragraphs 16 to 19 wherein the product of said contacting (ii) is subjected to an additional curing step to further cross-link said second polymer.

21. The process of paragraph 20 wherein, following said curing step, at least 70 wt % of said second polymer is insoluble in xylene.

22. The process of paragraph 20 or paragraph 21 wherein said curing step comprises dynamic vulcanization.

The invention will now be more particularly described with reference to the Examples and the accompanying drawings.

In the Examples, molecular weights (number average molecular weight (Mn), weight average molecular weight (Mw), and z-average molecular weight (Mz)) were determined using a Waters 150 Size Exclusion Chromatograph (SEC) equipped with a differential refractive index detector (DRI), an online low angle light scattering (LALLS) detector and a viscometer (VIS). The details of these detectors as well as their calibrations have been described by, for example, T. Sun, P. Brant, R. R. Chance, and W. W. Graessley, in *Macromolecules*, Volume 34, Number 19, 6812-6820, (2001), incorporated herein by reference. Solvent for the SEC experiment was prepared by adding 6 grams of butylated hydroxy toluene (BHT) as an antioxidant to a 4 liter bottle of 1,2,4 trichlorobenzene (TCB) (Aldrich Reagent grade) and waiting for the BHT to solubilize. The TCB mixture was then filtered through a 0.7 micron glass pre-filter and subsequently through a 0.1 micron Teflon filter. There was an additional online 0.7 micron glass pre-filter/0.22 micron Teflon filter assembly between the high pressure pump and SEC columns. The TCB was then degassed with an online degasser (Phenomenex, Model DG-4000) before entering the SEC. Polymer solutions were prepared by placing dry polymer in a glass container, adding the desired amount of TCB, then heating the mixture at 160° C. with continuous agitation for about 2 hours. All quantities were measured gravimetrically. The TCB densities used to express the polymer concentration in mass/volume units were 1.463 g/ml at room temperature and 1.324 g/ml at 135° C. The injection concentration ranged from 1.0 to 2.0 mg/ml, with lower concentrations being used for higher molecular weight samples.

The branching index in the Examples was measured using SEC with an on-line viscometer (SEC-VIS) and is reported as g' at each molecular weight in the SEC trace. The branching index g' is defined as:

$$g' = \frac{\eta_b}{\eta_l}$$

where $\eta_b$ is the intrinsic viscosity of the branched polymer and $\eta_l$ is the intrinsic viscosity of a linear polymer of the same viscosity-averaged molecular weight ($M_v$) as the branched polymer. $\eta_l = KM_v^\alpha$, K and α were measured values for linear polymers and should be obtained on the same SEC-DRI-LS-VIS instrument as the one used for branching index measurement. For polypropylene samples presented in this invention, K=0.0002288 and α=0.705 were used. The SEC-DRI-LS-VIS method obviates the need to correct for polydispersities, since the intrinsic viscosity and the molecular weight were measured at individual elution volumes, which arguably contain narrowly dispersed polymer. Linear polymers selected as standards for comparison should be of the same viscosity average molecular weight, monomer content and composition distribution. Linear character for polymer containing C2 to C10 monomers is confirmed by Carbon-13 NMR using the method of Randall (Rev. Macromol. Chem. Phys., C29 (2&3), p. 285-297). Linear character for C11 and above monomers is confirmed by GPC analysis using a MALLS detector. For example, for a copolymer of propylene, the NMR should not indicate branching greater than that of the co-monomer (i.e. if the comonomer is butene, branches of greater than two carbons should not be present). For a homopolymer of propylene, the GPC should not show branches of more than one carbon atom. When a linear standard is desired for a polymer where the comonomer is C9 or more, one can refer to T. Sun, P. Brant, R. R. Chance, and W. W. Graessley, *Macromolecules*, Volume 34, Number 19, 6812-6820, (2001) for protocols on determining standards for those polymers. In the case of syndiotactic polymers, the standard should have a comparable amount of syndiotacticty as measured by Carbon 13 NMR. The viscosity averaged g' was calculated using the following equation:

$$g'_{vis} = \frac{\sum C_i [\eta_i]_b}{\sum C_i K M_i^\alpha}$$

where $C_i$ is the polymer concentration in the slice i in the polymer peak, and $[\eta_i]_b$ is the viscosity of the branched polymer in slice i of the polymer peak, and $M_i$ is the weight averaged molecular weight in slice i of the polymer peak measured by light scattering, K and α are as defined above.

Peak melting point (Tm) and peak crystallization temperature (Tc) were determined using the following procedure according to ASTM E 794-85. Crystallinity was calculated using heat of fusion determined using ASTM D 3417-99. Differential scanning calorimetric (DSC) data were obtained using a TA Instruments model Q100 machine or a Perkin-Elmer DSC-7. Samples weighing approximately 5-10 mg were sealed in aluminum sample pans. The DSC data were recorded by first heating a sample from room temperature to 200° C. at a rate of 10° C./minute (1st melt). Then the sample was kept at 200° C. for 5 minutes before ramping at 10° C./minute to −100° C., followed by isothermal for 5 minutes at −100° C. then heating to 200° C. at a rate of 10° C./minute (2nd melt). Both the first and second cycle thermal events were recorded. The peak melting temperature and heat of fusion reported in the examples were obtained from the second melt. Areas under the melting curves were measured and used to determine the heat of fusion and the degree of crystallinity. The percent crystallinity is calculated using the formula, [area under the curve (Joules/gram)/B (Joules/gram)] *100, where B is the heat of fusion for the homopolymer of the major monomer component. These values for B were obtained from the Polymer Handbook, Fourth Edition, published by John Wiley and Sons, New York 1999. A value of 189 J/g (B) was used as the heat of fusion for 100% crystalline polypropylene. A value of 290 J/g is used for the heat of fusion for 100% crystalline polyethylene. For polymers displaying multiple cooling and melting peaks, all the peak crystallization temperatures and peaks melting temperatures were reported. The heat of fusion for each melting peak was calculated individually.

The glass transition temperature (Tg) was measured by ASTM E 1356 using a TA Instruments model Q100 machine.

Morphology data were obtained using an Atomic Force Microscope (AFM) in tapping phase. All specimens were analyzed within 8 hours after cryofacing to prevent specimen relaxation. During cryofacing, the specimens were cooled to −130° C. and cut with diamond knives in a Reichert cryogenic microtome. They were then stored in a dissector under flowing dry nitrogen gas to warm up to ambient temperatures without condensation being formed. Finally, the faced specimens were mounted in a miniature steel vise for AFM analysis. The AFM measurements were performed in air on a NanoScope Dimension 3000 scanning probe microscope (Digital Instrument) using a rectangular 225-mm Si cantilever. The stiffness of the cantilever was ~4 N/m with a resonance frequency of ~70 kHz. The free vibration amplitude was high, in the range of 80 nm to 100 nm, with a RMS setting of 3.8 volts. While the set point ratio was maintained at a value equal to or lower than 0.5, the contact set point was adjusted routinely to ensure repulsive contacts with positive phase shifts. The cantilever was running at or slightly below its resonance frequency.

AFM phase images of all specimens were converted into a TIFF format and processed using PHOTOSHOP (Adobe Systems, Inc.). The image processing tool kit (Reindeer Games, Inc.) was applied for image measurements. Results of image measurements were written into a text file for subsequent data processing using EXCEL (Microsoft) or MATLAB (MathWorks, Inc.) for computing sizes/shapes of dispersed phases, co-continuity factor of co-continuous phases, or nearest-neighbor inter-particle distances.

Transmission Electron Microscopy (TEM) was used to study details of the interface between the ethylene/propylene/diene rubber and the semi-crystalline polypropylene phases. The instrument used was the JEOL 2000FX microscope. A heavy metal staining technique was employed to provide contrast to delineate the details of the sample morphology. Ruthenium tetroxide provides excellent contrast between amorphous and crystalline regions and was used. Lower density and amorphous polymers take up more stain than do higher density and more crystalline components. Thus heavily stained components appear darker in TEM amplitude contrast images whereas less heavily stained materials appear lighter. The TEM analytical method used involved:

Setting the orientation of the plane of analysis. Typically the MD-ND (machine direction/normal direction) plane is preferred for samples that may be oriented in the machine direction.

Creating a deformation-free face through the bulk polymer sample using a cryomicrotome.

Staining with ruthenium tetroxide vapor for about 8 hours.

Cutting and collecting ultrathin (about 100 nm) sections from the stained face using an ultramicrotome. The cutting is done using a diamond knife. Sections are floated onto TEM grids.

Loading sections into the TEM for examination at the appropriate accelerating voltage (typically 160 to 200 kV).

Examining the sections to determine level of sampling needed.

Acquiring digital images using appropriate vendor software.

The ethylene content of ethylene/propylene copolymers was determined using FTIR according to the following technique. A thin homogeneous film of polymer, pressed at a temperature of about 150° C., was mounted on a Perkin Elmer Spectrum 2000 infrared spectrophotometer. A full spectrum of the sample from 600 cm$^{-1}$ to 4000 cm$^{-1}$ was recorded and the area under propylene band at ~1165 cm$^{-1}$ and the area of ethylene band at ~732 cm$^{-1}$ in the spectrum were calculated. The baseline integration range for the methylene rocking band is nominally from 695 cm$^{-1}$ to the minimum between 745 and 775 cm$^{-1}$. For the polypropylene band the baseline and integration range is nominally from 1195 to 1126 cm$^{-1}$. The ethylene content in wt. % was calculated according to the following equation:

$$\text{ethylene content (wt.\%)} = 72.698 - 86.495X + 13.696X^2$$

where $X = AR/(AR+1)$ and AR is the ratio of the area for the peak at ~1165 cm$^{-1}$ to the area of the peak at ~732 cm$^{-1}$.

Solvent extraction was used to isolate the different polymer species of the in-reactor polymer blends. The fractionations were carried out in a two-step successive solvent extraction when the polymer blend does not contain any oil: one involves cyclohexane extraction, the other xylene Soxhlet extraction. In the cyclohexane solvent extraction, about 0.3 gram of polymer was placed in about 60 ml of cyclohexane to isolate the uncured and lightly branched elastomeric components of the polymer blend. The mixture was continuously stirred at room temperature for about 48 hours. The soluble fraction (referred as cyclohexane solubles) was separated from the insoluble material (referred as cyclohexane insolubles) using filtration under vacuum. The insoluble material was then subjected to the xylene soxhlet extraction procedure. In this step, the insoluble material from the room temperature cyclohexane extraction was first extracted for about 24 hours with xylene. The xylene insoluble portion (referred as xylene insolubles) was recovered by filtration and is the extract containing the at least partially cross-linked second polymer. The remaining portion was cooled down to room temperature and retained in a glass container for 24 hours for precipitation. The precipitated component (referred as xylene precipitate) was recovered through filtration and the soluble component (referred as xylene soluble) was recovered by evaporating the xylene solvent. The xylene precipitate fraction is where the thermoplastic crystalline component resides. In the case of blends containing paraffinic oil plasticizer and the like, another Soxhlet solvent extraction step was performed on the sample for 24 hours to isolate the oil from the blend before the cyclohexane extraction and xylene Soxhlet extraction using an azeoptrope of acetone and cyclohexane in the ratio 2:1 by volume.

In order to measure the physical properties of the polymer blends, samples were first mixed in a Brabender melt mixer with ~45 mL mixing head. The polymer was stabilized with antioxidant during mixing in the Brabender. The Brabender was operated at 100 rpm and at temperature of 180° C. Mixing time at temperature was 5-10 minutes, after which the sample was removed from the mixing chamber. The homogenized samples were molded under compression into film on a Carver hydraulic press for analysis. About 7 grams of the homogenized polymer were molded between brass platens lined with Teflon™ coated aluminum foil. A 0.033 inch (0.08 cm) thick chase with a square opening 4 inch×4 inch (10.2× 10.2 cm) was used to control sample thickness. After one minute of preheat at 170° C. or 180° C., under minimal pressure, the hydraulic load was gradually increased to 10,000 to 15,000 lbs, at which it was held for three minutes. Subsequently the sample and molding plates were cooled for three minutes under 10,000 to 15,000 lbs load between the water-cooled platens of the press. Plaques were allowed to equilibrate at room temperature for a minimum of 24 hours prior to physical property testing.

Loss Modulus (E"), Storage Modulus (E') and β relaxation were measured by dynamic mechanical thermal analysis (DMTA). The instrument used was the RSA II, Rheometrics Solid Analyzer II from TA Instruments, New Castle, Del. The instrument was operated in tension mode and used molded rectangular samples. Sample conditions were: 0.1% strain, 1 Hz frequency, and 2° C. per minute heating rate, covering the temperature range from −135° C. to the melting point of the sample. Samples were molded at about 200° C. Typical sample dimensions were 23 mm length×6.4 mm width×thickness between 0.25 mm and 0.7 mm, depending on the sample. Tan δ is the ratio of E"/E'. The output of these DMTA experiments is the storage modulus (E') and loss modulus (E"). The storage modulus measures the elastic response or the ability of the material to store energy, and the loss modulus measures the viscous response or the ability of the material to dissipate energy. The ratio of E"/E' (=tan δ) gives a measure of the damping ability of the material. Energy dissipation mechanisms (i.e., relaxation modes) show up as peaks in tan δ, and are associated with a drop in E' as a function of temperature. The uncertainty associated with reported values of E' is expected to be on the order of ±10%, due to variability introduced by the molding process.

Shore hardness was determined according to ISO 868 at 23° C. using a Durometer.

Stress-strain properties such as ultimate tensile strength, ultimate elongation, and 100% modulus were measured on 2 mm thick compression molded plaques at 23° C. by using an Instron testing machine according to ISO 37.

Compression set test was measured according to ISO 815 A.

Tension set was measured according to ISO 2285.

Oil swell (oil gain) was determined after soaking a die-cut sample from compression molded plaque in IRM No. 3 fluid for 24 hours at 125° C. according to ASTM D 471.

LCR viscosity was measured using Laboratory Capillary Rheometer according to ASTM D 3835-02 including that the viscosity is measured using a Dynisco Capillary rheometer at 30:1 L/D (length/diameter) ratio, a shear rate of 1200 l/s and a temperature of 204° C. The entrance angle of the laboratory capillary rheometer is 180°, barrel diameter is 9.55 mm. The heat soak time is 6 minutes.

Example 1

A polymer blend was produced in a two-stage polymerization reaction by polymerizing propylene in a first stage to make homopolymer, and copolymerizing propylene and ethylene as well as a diene cross-linking agent in a second stage in the presence of the homopolymer produced in the first stage. The polymerization was carried out in a 2-liter autoclave reactor equipped with a stirrer, an external water/steam jacket for temperature control, a regulated supply of dry nitrogen, ethylene, and propylene, and a septum inlet for introduction of other solvents, catalysts and scavenger solutions. The reactor was first washed using hot toluene and then dried and degassed thoroughly prior to use. All the solvents and monomers were purified by passing through a 1-liter basic alumina column activated at 600° C., followed by a column of molecular sieves activated at 600° C. or Selexsorb CD column prior to transferring into the reactor.

In the first stage of polymerization, 3 ml of tri-n-octylaluminum (TNOA) (25 wt. % in hexane, Sigma Aldrich) solution was first added to the reactor. In succession, solvent (diluent) and propylene were added into the reactor. All of these were conducted at room temperature. The mixture was then stirred and heated to the desired temperature for the first polymerization stage. Then the catalyst solution was cannulated into the reactor using additional propylene. The first stage of polymerization was ended when the desired amount of polypropylene was produced. Thereafter, the reactor was heated up to the desired temperature of the second polymerization stage. About 6~12 ml of air was injected into the reactor with about 100 ml of additional solvent to partially deactivate the catalyst used in the first stage of polymerization. The reaction medium was kept under proper mixing for about 8 minutes to allow good catalyst-air contact prior to second stage of polymerization. The reactor was then pressurized to about 400 psig with ethylene. Then, in succession, diene, additional scavenger (TNOA or TEAL) and the second catalyst solution were added into the reactor. Additional ethylene was fed into the reactor, and the ethylene was fed on demand to maintain a relatively constant reactor pressure during the second polymerization reaction. The second polymerization reaction was terminated when desired amount of rubber was produced. Thereafter, the reactor was cooled down and unreacted monomer and solvent (diluent) were vented to the atmosphere. The resulting mixture, containing mostly solvent, polymer and unreacted monomers, was collected in a collection box and first air-dried in a hood to evaporate most of the solvent, and then dried in a vacuum oven at a temperature of about 90° C. for about 12 hours.

1,9-decadiene was used as the diene cross-linking agent in the second polymerization stage. The 1,9-decadiene was obtained from Sigma-Aldrich and was purified by first passing through an alumina column activated at high temperature under nitrogen, followed by a molecular sieve activated at high temperature under nitrogen.

Rac-dimethylsilyl bis(2-methyl-4-phenylindenyl) zirconium dimethyl catalyst (Catalyst A) was used in the first stage to produce polypropylene and [di(p-triethylsilylphenyl)methylene] (cyclopentadienyl) (3,8-di-t-butylfluorenyl)hafnium dimethyl catalyst (Catalyst B) (obtained from Albemarle) was used in the second stage to produce ethylene propylene diene rubber. Both catalysts were preactivated by dimethylanilinum tetrakis(heptafluoro-2-naphthyl) borate at a molar ratio of 1:1 in toluene. Details of the experimental conditions, catalysts employed and the properties of the resultant polymer blends are listed in Table 1 A below.

TABLE 1A

| Polymerization in Stage 1 | |
|---|---|
| Reaction temperature (° C.) | 75 |
| Amount of catalyst A (mg) | 0.5 |
| Propylene #1 (ml) | 700 |
| Toluene (ml) | 500 |
| TNOA (25 wt. %) (ml) | 3 |

TABLE 1A-continued

| Reaction time1 (min) | 7 |
|---|---|
| Polymerization in Stage 2 | |
| Reaction temperature (° C.) | 75 |
| Amount of catalyst B (mg) | 1 |
| Propylene2 (ml) | |
| Ethylene head pressure (psi) | 230 |
| 1,9 decadiene (ml) | 50 |
| Toluene (ml) | 300 |
| TNOA (25 wt %) (ml) | 5 |
| Reaction time2 (min) | 10 |
| Yield (g) | 88 |
| Tm (° C.) | 154.16 |
| Tc (° C.) | 102.31 |
| Heat of fusion (J/g) | 10.6 |
| Tg (° C.) | −48.11 |
| Ethylene content (wt %) | 34.3 |
| Xylene precipitate (wt %) | 11.66 |
| Xylene insolubles (wt %) | 55.11 |
| Xylene solubles (wt %) | 21.33 |
| Cyclohexane solubles (wt %) | 9.81 |
| Degree of cross-link (%) | 62.4 |

The in-reactor produced polymer blend produced in Example 1 was subjected to solvent extraction. The amount of each fraction is listed in Table 1 A. The amount of each fraction is listed as the weight percent of total in-reactor produced polymer blend. Degree of cross-linking is defined as:

$$\text{Degree of cross-link} = \frac{\text{Percent of xylene insoluble}}{100 - \text{percent of xylene precipitate}} \times 100$$

The degree of cross-link is also referred as to the percent of the second polymer insoluble in xylene. Percent of the second polymer extractable in cyclohexane is defined as $$\frac{\text{Percent of cyclohexane soluble}}{100 - \text{percent of xylene precipitate}} \times 100$$

The Tg value shown in the Table 1 A above refers to the elastomer component of the reactor-produced blend. The value provides an indication of the amorphous nature of the elastomer component. The Tg of the polypropylene component—located primarily in the xylene precipitate fraction—is generally about 0° C., typical for semi-crystalline propylene homopolymers.

The morphology of the blend produced in Example 1 was examined using AFM according to the procedure described above and the results are shown in FIG. 1.

A sample of the polymer blend produced in Example 1 was melt mixed in a Brabender mixer and molded under compression into plaques, and tested for thermoplastic elastomer applications. Further samples of the polymer blend produced in Example 1 were further cured by dynamic vulcanization. The vulcanization was effected by conventional techniques within a Brabender mixer along with the other added ingredients listed in Table 1B. Silicon hydride DC 25804 (1.97%) was obtained from Dow Corning. The silicon hydride was a polysiloxane with silicon hydride functionality. Platinum catalyst mixture (PC085) (2.63%) was obtained from United Chemical Technologies Inc. The catalyst mixture included 0.0055 parts by weight platinum catalyst and 2.49 parts by weight mineral oil. Zinc oxide was obtained from Zinc Corporation of America and paraffinic oil Paralux 6001R was obtained from Chevron Oil Corporation. The performance data obtained according to the procedures described above are listed in Table 1B.

TABLE 1B

| | | | |
|---|---|---|---|
| Polymer (wt. %) | 100 | 69.93 | 65.79 |
| Paralux 6001R (wt. %) | 0 | 30.07 | 28.29 |
| SiH-DC25804 (wt. %) | 0 | 0 | 1.97 |
| Pt Catalyst (PC 085) (wt. %) | 0 | 0 | 2.63 |
| Zinc oxide (wt. %) | 0 | 0 | 1.32 |
| Hardness | 60A | 38A | 41A |
| Ultimate tension strength (psi) | 712 | 422.4 | 345.9 |
| Ultimate elongation (%) | 118 | 128 | 141.9 |
| 100% Modulus (psi) | 684 | 327.6 | 233.1 |
| LCR viscosity 1200 1/s (Pa-s) | NA | 331.6 | 103.5 |
| Tension set (%) | 8.25 | 2.75 | 4.75 |
| Compression set, 70° C./22 Hrs (%) | 22.7 | 22.3 | 29.2 |
| Weight gain, 121° C./24 hrs (%) | 375.5 | 332 | 205 |

Example 2

This sample was produced in a 2-liter autoclave reactor following the same procedure as that used in Example 1, except that no air injection was used in between Stage 1 and Stage 2 polymerization. The same catalyst was used in both stages of polymerization, and the catalyst was preactivated with N,N-dimethylanilinium tetrakis (pentafluorophenyl) borate (obtained from Albemarle) at a molar ratio of about 1:1 in toluene. Triisobutyl aluminum (TIBAL) (25 wt % in toluene, purchased from Sigma-Aldrich) was used as a scavenger. The detailed reaction conditions and polymer properties are listed in Table 2 A.

TABLE 2A

| Polymerization in Stage 1 | |
|---|---|
| Reaction temperature (° C.) | 70 |
| Amount of catalyst A (mg) | 0.5 |
| Propylene #1 (ml) | 500 |
| Hexane (ml) | 700 |
| TIBAL (25 wt % in Toluene) (ml) | 4 |
| Reaction time1 (min) | 4 |
| Polymerization in Stage 2 | |
| Reaction temperature (° C.) | 85 |
| Amount of catalyst A (mg) | 0.72 |
| Ethylene head pressure (psi) | 200 |
| 1,9 decadiene (ml) | 4 |
| Hexane (ml) | 100 |
| Reaction time2 (min) | 28 |
| Yield (g) | 131.2 |
| Tm (° C.) | 158.45 |
| Tc (° C.) | 107.36 |
| Heat of fusion (J/g) | 11.35 |
| Ethylene content (wt %) | 24.7 |
| Xylene precipitate (wt %) | 14.1 |
| Xylene insolubles (wt %) | 29.6 |
| Xylene solubles (wt %) | 6 |
| Cyclohexane solubles (wt %) | 50.22 |
| Degree of cross-link (%) | 34.5 |

The in-reactor produced polymer blend of Example 2 was subjected solvent extraction using the procedure described above. The amount of each extracted fraction is expressed as weight percent of total polymer blend, and is listed in Table 2 A. The morphology of the blend produced in Example 2 was examined using AFM according to the procedure described above and the results are shown in FIG. 2.

A sample of the polymer blend produced in Example 2 was melt mixed in a Brabender mixer and molded under compression into plaques, and tested for thermoplastic elastomer applications. A further sample of the polymer blend produced in Example 2 was compounded with a processing oil (Paralux 6001R). The performance data obtained using the procedure described above are listed in Table 2B.

TABLE 2B

| Polymer (wt. %) | 100 | 70 |
|---|---|---|
| Paralux 6001R (wt. %) | 0 | 30 |
| Hardness | 37A | 12A |
| Ultimate tension strength (psi) | 412 | 416 |
| Ultimate elongation (%) | 330 | 522 |
| 100% Modulus (psi) | 250 | 79 |
| LCR viscosity 1200 1/s (Pa-s) | 263.8 | 49.1 |
| Tension set (%) | 14.75 | 9.25 |
| Compression set, 70° C./22 Hrs (%) | 60.46 | 55.24 |
| Weight gain, 121° C./24 hrs (%) | 357.7 | 558.5 |

All documents described herein are incorporated by reference herein, including any priority documents and/or testing procedures to the extent they are not inconsistent with this text. While there have been described what are presently believed to be the preferred embodiments of the present invention, those skilled in the art will realize that other and further embodiments can be made without departing from the spirit of the invention, and is intended to include all such further modifications and changes as come within the true scope of the claims set forth herein. Likewise, the term "comprising" is considered synonymous with the term "including" for purposes of Australian law.

What is claimed is:

1. A process for producing a heterogeneous polymer blend comprising:
   (a) less than 20% by weight (based on the total heterogeneous polymer blend) of a dispersed phase comprising a thermoplastic first polymer having a crystallinity of at least 30%; and
   (b) a continuous phase having a crystallinity of less than 20% and comprising an elastomeric second polymer different from said thermoplastic first polymer and a hybrid species, said hybrid species comprising a branch-block copolymer having an amorphous backbone and crystalline side chains originating from said thermoplastic first polymer, wherein at least 20% by weight of said continuous phase is insoluble in xylene and substantially free of curatives added to effect post-polymerization cross-linking, the process comprising:
   (i) polymerizing at least one first monomer comprising a $C_2$ to $C_{20}$ olefin to produce the thermoplastic first polymer;
   (ii) contacting at least part of said thermoplastic first polymer with a plurality of comonomers comprising at least one $C_3$ to $C_{20}$ olefin and at least one polyene under conditions sufficient to polymerize said comonomers to produce, and simultaneously cross-link, said elastomeric second polymer as finely divided particles.

2. The process of claim 1, wherein said polymerizing step (i) is conducted in the presence of a catalyst and said contacting step (ii) is conducted in the presence of said same catalyst.

3. The process of claim 1, wherein said polymerizing step (i) is conducted in the presence of a first catalyst and said contacting step (ii) is conducted in the presence of a second catalyst different from said first catalyst.

4. The process of claim 1, wherein said product of said contacting step (ii) is subjected to an additional curing step to further cross-link said second polymer.

5. The process of claim 4, wherein following said curing step, at least 70 wt % of said elastomeric second polymer is insoluble in xylene.

6. The process of claim 4, wherein said curing step comprises dynamic vulcanization.

7. The process of claim 2,
   wherein said catalyst is capable of polymerizing said $C_2$ to $C_{20}$ olefin to produce said thermoplastic first polymer; and
   wherein said elastomeric second polymer comprises at least 15 wt % of said $C_3$ to $C_{20}$ olefin and at least 0.0001 wt % of said polyene.

8. The process of claim 7, wherein said thermoplastic first polymer produced in said contacting step (i) of claim 1 has at least 0.01% terminal unsaturation.

9. The process of claim 7, wherein said $C_2$ to $C_{20}$ olefin comprises propylene.

10. The process of claim 7, wherein said polyene has at least two polymerizable unsaturated groups.

11. The process of claim 7, wherein said product of said contacting step (ii) of claim 1 is subjected to an additional curing step to further cross-link said second polymer.

12. The process of claim 11, wherein said curing step comprises dynamic vulcanization.

13. The process of claim 3,
   wherein said first catalyst is capable of polymerizing said $C_2$ to $C_{20}$ olefin to produce said thermoplastic first polymer; and
   wherein said elastomeric second polymer comprises at least 15 wt % of said $C_3$ to $C_{20}$ olefin and at least 0.0001 wt % of said polyene.

14. The process of claim 13, wherein said thermoplastic first polymer produced in said contacting step (i) of claim 1 has at least 0.01% terminal unsaturation.

15. The process of claim 13, wherein said $C_2$ to $C_{20}$ olefin comprises propylene.

16. The process of claim 13, wherein said polyene has at least two polymerizable unsaturated groups.

17. The process of claim 13, wherein said product of said contacting step (i) of claim 1 is subjected to an additional curing step to further cross-link said second polymer.

18. The process of claim 13, wherein said additional curing step comprises dynamic vulcanization.

* * * * *